United States Patent
Mitaritonna et al.

(10) Patent No.: US 8,353,204 B2
(45) Date of Patent: Jan. 15, 2013

(54) METHOD AND SYSTEM FOR TURBINE BLADE CHARACTERIZATION

(75) Inventors: Nicola Mitaritonna, Florence (IT); Stefano Cioncolini, Florence (IT)

(73) Assignee: Nuovo Pignone, S.p.A., Florence (IT)

( * ) Notice: Subject to any disclaimer, the term of this patent is extended or adjusted under 35 U.S.C. 154(b) by 477 days.

(21) Appl. No.: 12/598,391

(22) PCT Filed: Apr. 30, 2008

(86) PCT No.: PCT/IB2008/003340
§ 371 (c)(1),
(2), (4) Date: Oct. 30, 2009

(87) PCT Pub. No.: WO2009/034476
PCT Pub. Date: Mar. 19, 2009

(65) Prior Publication Data
US 2010/0116044 A1    May 13, 2010

Related U.S. Application Data

(60) Provisional application No. 60/914,998, filed on Apr. 30, 2007.

(51) Int. Cl.
*G01M 9/00* (2006.01)
(52) U.S. Cl. .......................................... 73/147
(58) Field of Classification Search ............... None
See application file for complete search history.

(56) References Cited

U.S. PATENT DOCUMENTS

| | | | |
|---|---|---|---|
| 4,112,774 A * | 9/1978 | Chadwick | 73/455 |
| 4,776,216 A | 10/1988 | Barton et al. | |
| 7,244,095 B2 * | 7/2007 | Hays | 415/84 |
| 7,360,993 B2 * | 4/2008 | Fraenkel | 415/232 |
| 7,596,428 B2 * | 9/2009 | Potdar et al. | 700/280 |
| 2002/0083772 A1 | 7/2002 | Sonnichsen et al. | |

FOREIGN PATENT DOCUMENTS

| EP | 0826949 A2 | 3/1998 |
|---|---|---|
| WO | 2006065445 A2 | 6/2006 |

OTHER PUBLICATIONS

CN Office Action issued May 25, 2011 and unofficial English translation from corresponding CN Application No. 200880014127.1.
CN Office Action issued Jun. 1, 2012 and unofficial English translation from corresponding CN Application No. 200880014127.1.
EP Office Action dated Apr. 23, 2012 from corresponding EP Application No. 08831021.4.
PCT Search Report and Written Opinion dated Feb. 1, 2010 from corresponding Application No. PCT/IB2008/003340.

* cited by examiner

*Primary Examiner* — Lisa Caputo
*Assistant Examiner* — Jermaine Jenkins
(74) *Attorney, Agent, or Firm* — GE Global Patent Operation

(57) ABSTRACT

Methods and systems providing for characterizing turbine blades, including characterizing the dynamics of one or more turbine blades or stages of a stage in terms of natural frequencies, normalized response intensity, and/or stage modal shape or nodal configuration. Such methods and systems comprise fluid (e.g., oil) excitation of bladed disks and quantitative modeling of the fluid excitation. Additionally or alternatively, such methods and systems may provide for analyzing modal shape or nodal configuration of a bladed disk (e.g., a turbine stage) based on a phase analysis of strain signals acquired from a bladed disk subjected to a fluid excitation, wherein the modal shape or nodal configuration corresponds to modes of blades coupled through a disc or shrouding.

16 Claims, 20 Drawing Sheets

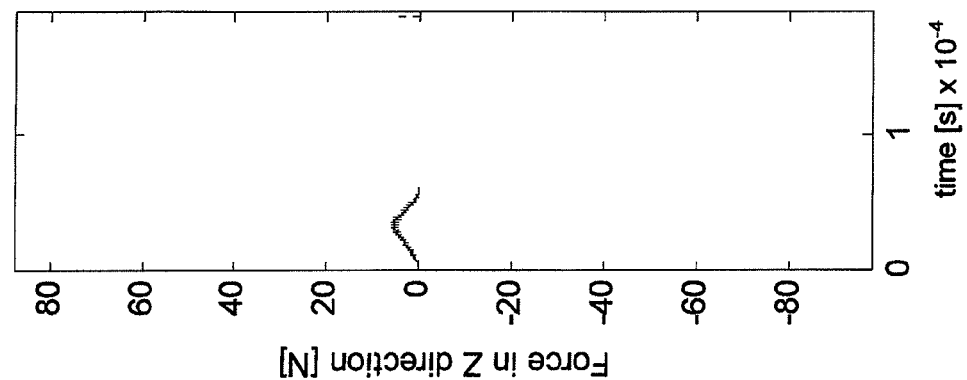
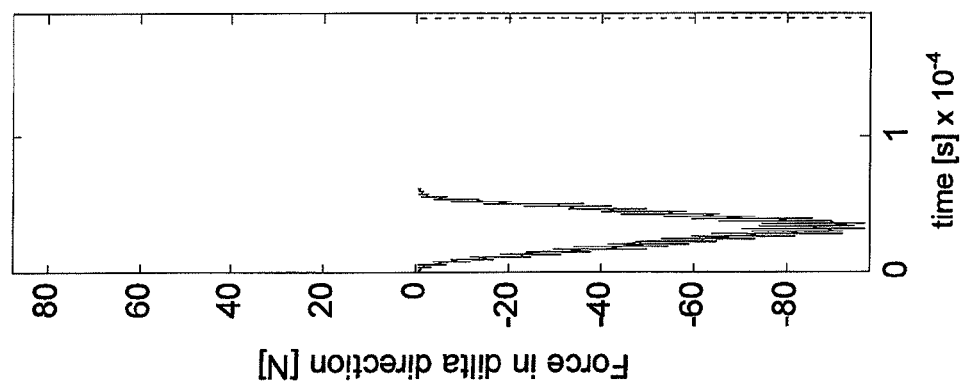
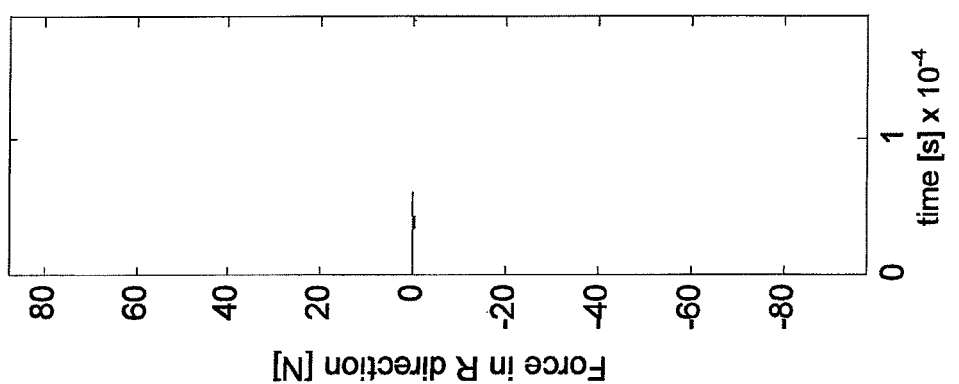

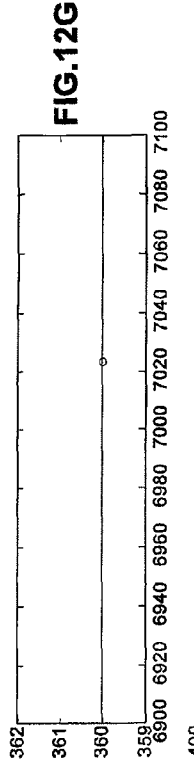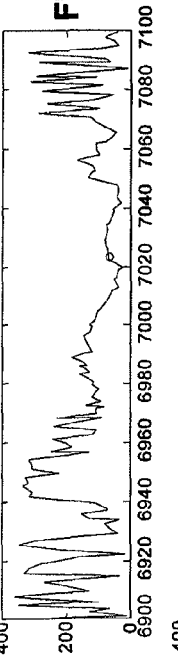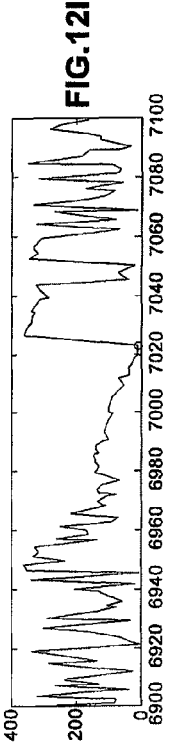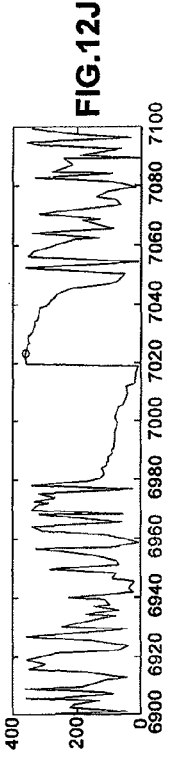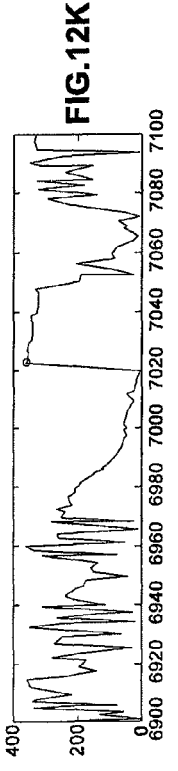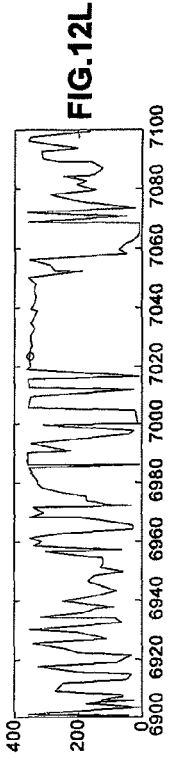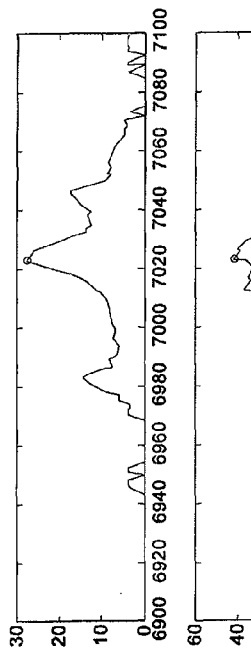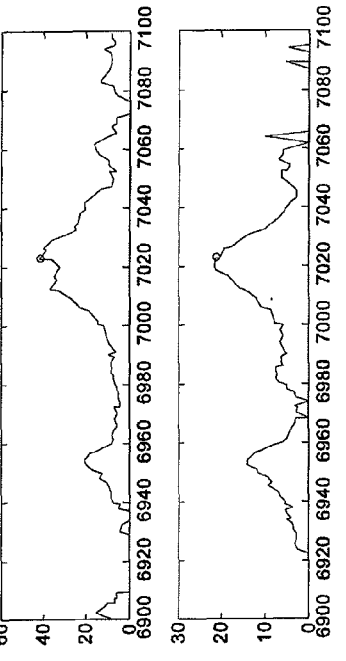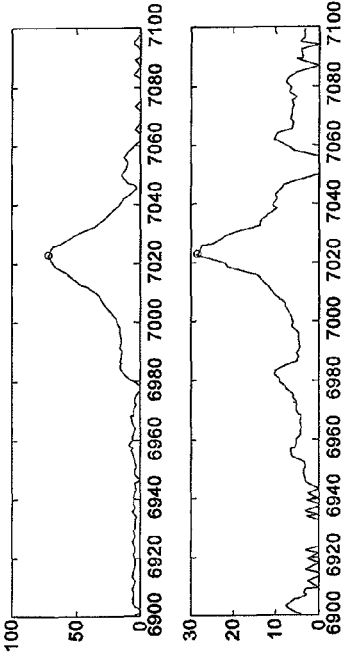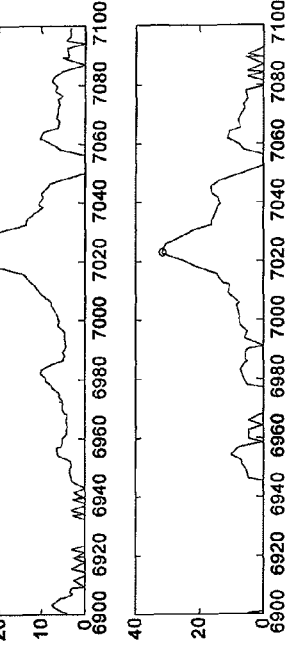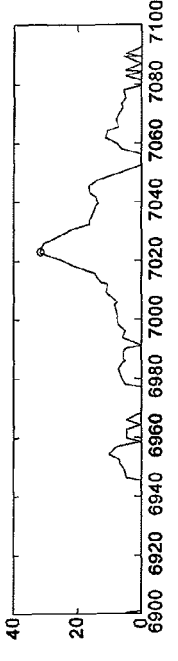

METHOD AND SYSTEM FOR TURBINE BLADE CHARACTERIZATION

RELATED APPLICATIONS

This application is filed pursuant to 35 USC 371 based on International Application No. PCT/IB2008/003340, filed Apr. 30, 2008, which claims the benefit of U.S. Provisional Application No. 60/914,998, filed Apr. 30, 2007, which is incorporated herein by reference in its entirety.

TECHNICAL FIELD

The present invention relates to turbomachinery, and, more particularly, to characterizing and comparing blade response based on wheel-box testing with fluid (e.g., oil) excitation and on modeling of the fluid excitation, and to characterizing the dynamics of one or more turbine stages, providing for characterization of a stage in terms of natural frequencies, normalized response intensity, and stage modal shape (also referred to as nodal configuration).

BACKGROUND

Generally, a standard wheel-box test may be used for characterizing turbine blades; however, such known tests only partially address desires and needs for turbine blade design. For instance, the output of such tests only provide for measuring the natural frequencies of the system, with poor information about wheel\blade modal forms and forcing excitation. Consequently, standard wheel-box tests allow for only output-output analysis (e.g., the determination of the quality factor).

Additionally, in such standard wheel-box tests, the excitation is typically reproduced by means of a gas spray, and thus cannot be performed at too low of an absolute pressure. Further, it may be noted that the excitation forces produced with a gas spray are limited by the vacuum pump flow rate capability. This limit does not allow for using high spray flow rates and consequently does not allow for high impulse forces on the blades.

Consonant with the foregoing, the present inventors are unaware of any works modeling or characterizing (e.g., quantifying) a gas spray excitation (which excitation is very difficult to model), providing for complex characterization. The difficulties in modeling or characterizing the gas spray excitation (e.g., quantifying) also limits standard wheel-box testing; for example, this inability prevents designing and/or optimizing the excitation to excite one or more specific modes (e.g., as may be desired by a customer).

While software (e.g., LMS, B&K, AGILIS, etc.) is available for performing post-processing of test-data signals acquired during wheel-box tests and providing for the characterization of the modal shapes, such post-processing software represents a specific methodology of characterizing modal shapes and has various limitations. For instance, such post-processing software do not allow for closing the loop through the analysis of the excitation.

In other words, techniques for measuring, analyzing, and/or characterizing rotating blades (e.g., dynamic characterization of turbine blades) are generally limited to output-output type techniques and, for example, use neither excitation modeling nor input-output methodologies.

SUMMARY OF INVENTION

Various embodiments of the present invention provide methods and apparatuses for testing, characterizing, and/or analyzing turbomachinery based on a fluid excitation and quantitative modeling of the fluid excitation. Various embodiments of the present invention additionally or alternatively provide methods and apparatuses for testing, characterizing, and/or analyzing modal shape or nodal configuration of a bladed disk (e.g., a turbine stage) based on a phase analysis of strain signals acquired from a bladed disk subjected to a fluid excitation, wherein the modal shape or nodal configuration corresponds to modes of blades coupled through a disc or shrouding.

In accordance with some embodiments of the present invention, a method providing for characterizing a turbine blade, comprises providing at least one turbine blade on a rotor; rotating the rotor, thereby rotating the at least turbine blade; impinging a liquid onto the turbine blade during rotation of the at least one turbine blade; and providing a quantitative model of the excitation force imparted on the at least one turbine blade by the impinging liquid. The liquid may be an oil, impinged as an atomized spray. The impingement of the liquid onto the at least one turbine blade may be controlled according to the quantitative model of the excitation force imparted onto the at least one turbine blade by the liquid. The signals received from sensors that are directly or indirectly coupled to the turbine blades may be processed according to the quantitative model. The processing may include analyzing phase information from the sensors to determine the modal shape/nodal configuration among a plurality of the at least one turbine blade.

In some embodiments, a method providing for characterizing at least one turbine blade comprises modeling the excitation force imparted onto the at least one turbine blade by a liquid; and controlling the impingement of the liquid onto the at least one turbine blade according to the excitation force model. The excitation force model may provide the excitation force as a function of time and/or provides the excitation force frequency components or harmonic content.

In some embodiments, a method providing for characterizing at least one turbine blade comprises processing signals received from sensors directly or indirectly coupled to turbine blades mechanically excited by a liquid, wherein the processing is performed according to a quantitative model of the excitation force imparted on the at least one turbine blade by the liquid. The processing may comprise determining the modal shape/nodal configuration among a plurality of the turbine blades. The excitation force model may provide the excitation force as a function of time and/or provides the excitation force frequency components or harmonic content.

In some embodiments, a method providing for characterizing at least one turbine blade comprises processing phase signals received from sensors directly or indirectly coupled to turbine blades to determine the modal shape/nodal configuration among a plurality of the turbine blades. The received phase signals may correspond to the turbine blades being mechanically excited by a liquid.

Various embodiments of the present invention also may comprise relating the response of the turbine blades determined by the modal shape/nodal configuration analysis with the quantification of the excitation to provide damping factors associated with at least one modal shape/nodal configuration.

Various embodiments of the present invention also comprise at least one computer-readable medium, and/or a system comprising at least computer-readable medium, wherein the at least one computer-readable medium stores programming that when executed by at least one computer is operative in the at least one computer implementing one or more of the methods described above and/or otherwise described and/or claimed herein.

It will be appreciated by those skilled in the art that the foregoing brief description and the following detailed description are exemplary and explanatory of the present invention, but are not intended to be restrictive thereof or limiting of the advantages which can be achieved by this invention. Additionally, it is understood that the foregoing summary of the invention is representative of some embodiments of the invention, and is neither representative nor inclusive of all subject matter and embodiments within the scope of the present invention. Thus, the accompanying drawings, referred to herein and constituting a part hereof, illustrate embodiments of this invention, and, together with the detailed description, serve to explain principles of this invention.

BRIEF DESCRIPTION OF THE DRAWINGS

Aspects, features, and advantages of embodiments of the invention, both as to structure and operation, will be understood and will become more readily apparent when the invention is considered in the light of the following description made in conjunction with the accompanying drawings, in which like reference numerals designate the same or similar parts throughout the various figures, and wherein:

FIGS. 5A-C shows the force in the {r, δ, z} reference system for the illustrative case represented by the histogram of impacts depicted in FIG. 4; in accordance with some embodiments of the present invention;

FIGS. 12A-F show the magnitude of the responses, plotted as microstrain vs. rpm, for six blades, for an experimental test performed in accordance with some embodiments of the present invention;

FIGS. 12G-L show the respective phase data, plotted as degrees vs. rpm, for the six blades, corresponding to the magnitude data of FIGS. 12A-F, for an experimental test performed in accordance with some embodiments of the present invention;

DESCRIPTION OF EMBODIMENTS OF THE INVENTION

As will be understood in view of the ensuing description, various embodiments of the invention relate to experimental testing, and include aspects and embodiments that may be divided, for convenience, into three primary areas: test set-up; excitation analysis/modeling; and post-processing (e.g., phase\tonal analysis). As will be understood, subject matter embraced by the present invention includes, but is not limited to, embodiments directed to each of these primary areas individually, as well as to embodiments directed to combinations of two or more of these primary areas. More specifically, as will be understood by those skilled in the art, methods and systems according to embodiments of the present invention include integrating embodiments and/or aspects of all three areas in order to define and characterize the mechanical response of the system (e.g., the turbine blades being tested).

Additionally, as will be understood by those skilled in the art in view of the present disclosure, methods and systems according to embodiments of the present invention provide for experimental measurements of the vibration characteristic parameters (natural frequencies, damping factors associated with each modal shape, etc) on rotating buckets/blades wheels. Methods and systems according to embodiments of the present invention allow for the characterization of the stage in terms of natural frequencies, normalized response intensity, and stage modal shape (nodal configuration). In addition, it will be appreciated in view of the present disclosure that tests according to embodiments of the present invention may be performed in a relatively early phase of the design development, since it does not require the entire flowpath hardware.

Figure 1:
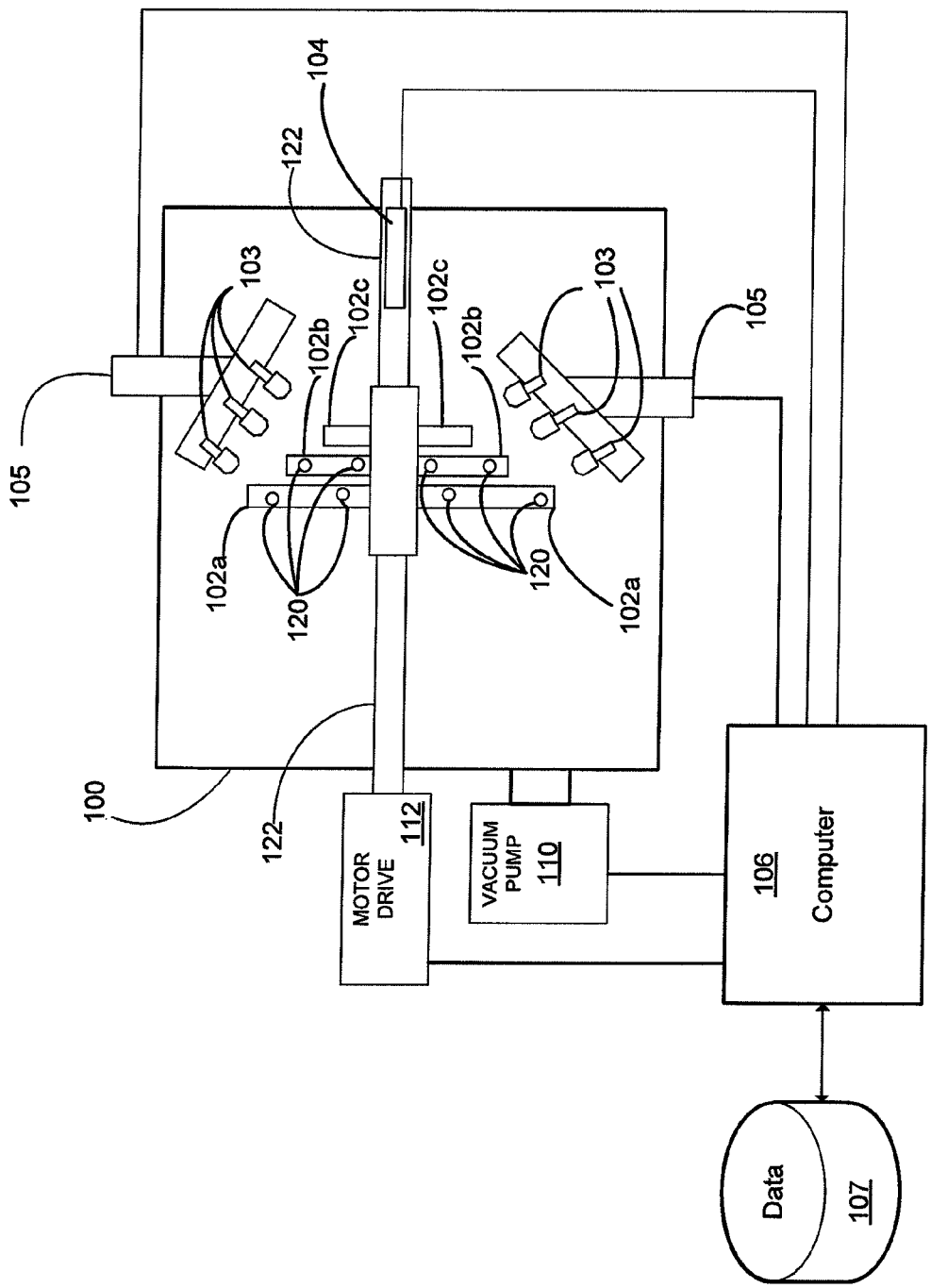
FIG. 1 schematically depicts an illustrative test set-up for exciting one or more bladed wheels with a liquid (e.g. oil) during a wheel-box test, in accordance with some embodiments of the present invention.

FIG. 1 schematically depicts an illustrative test set-up for exciting one or more bladed wheels (e.g., a compressor\turbine blade wheel) with a liquid (e.g. oil) during a wheel-box test, in accordance with some embodiments of the present invention. More specifically, the depicted embodiment includes a chamber 100 in which three bladed wheels 102a, 102b, 102c (e.g., turbine stages, each comprising a number of turbine blades mechanically coupled to a common shroud) are mounted on a rotor shaft 122 that is driven by motor drive 112. Chamber 100 may be evacuated to a desired pressure by vacuum pump 110, which is communicably coupled to computer 106. By way of example, a test may be performed at very low absolute pressure (e.g., on the order of 10 mbar) in chamber/bunker 100 by control of vacuum pump 100, thus increasing the measured signal-to-noise ratio.

One or more of the bladed wheels 102a, 102b, 102c each includes at least a plurality of blades that each includes one or more strain gauges, schematically depicted as gauges 120, mounted thereon. The strain gauge signals are communicably coupled (link not shown for clarity) to a communication interface 104, which is mounted toward an end of shaft 122 and is communicably coupled to computer 106. (While communicable connections are depicted by lines, such lines schematically depict a communication link, which may be implemented by a conductive connection (e.g., a cable, bus, etc.) and/or by a wireless connection (e.g., telemetry), and may provide for unidirectional or bidirectional signal communication, depending on the implementation and functional requirements.

The system includes a plurality of controllable nozzles 103 disposed about one or more of the bladed wheels 102a, 102b, 102c (e.g., turbine stages) for directing fluid onto the blades of one of more of the bladed wheels 102a, 102b, 102c. For ease of understanding, only two nozzles 103 are schematically depicted as being directed on each stage/disk. In accordance with various embodiments of the present invention, as will be further understood in view of the excitation model presented hereinbelow, nozzles 103 are implemented as atomizing type nozzles. Each of the nozzles 103 may be configured or mounted such that its orientation and/or position relative to the blades and bladed wheels is adjustable, so that the nozzle may direct fluid onto the blades from various circumferential and/or radial positions relative to the blade disc, and from various angles relative to the blade surface. Each nozzle 103 is coupled to a fluid supply (not shown) and is separately controllable by computer 106 (e.g., by means of a controllable valve to throttle and gate the fluid flow, an adjustable pin to adjust the nozzle aperture/annulus, etc.) to control the fluid emission parameters (e.g., spray mass flow, pressure, heat, etc.). For clarity of exposition, positional/orientation control as well as fluid emission parameter control by computer 106 is schematically depicted by computer 106 being communicably coupled to a manifold/feedthrough 105, which is coupled to nozzles 103.

As indicated above, computer 106 is communicably coupled for controlling and/or receiving signals (e.g., signals from strain sensors 102a, various sensors for monitoring other parameters/conditions and/or for feedback control, etc.) from vacuum pump 110, motor drive 112, nozzles 103, and gauges 120 via interface 104. Computer 106 may store acquired test data sets on storage medium 107. Computer 106 is also operable for executing software to provide program control of testing operations including, in accordance with some embodiments, controlling nozzles 103 to provide desired forcing excitations as determined in accordance with a model of the fluid excitation. Computer 106 may also be operable to perform analysis or other post-acquisition processing of the acquired test data, such as performing tonal analysis in accordance with some embodiments of the present invention. It will be understood, however, that such post-processing, as well as other modeling (e.g. excitation modeling) or pre-test analysis or data generation (e.g., for generating desired excitation signals) may be implemented offline by one or more other computers that may not be useable for testing.

In accordance with some embodiments of the present invention, a wheel is excited by impingement of a certain number of (e.g., one or more) oil spray jets (e.g., nozzles 103 in the test set-up of FIG. 1). Once the blade, rotating at the rotational speed, comes in contact with the oil, it accelerates each oil droplet of the spray along its rotational direction. In this way, the momentum variation impressed on the oil droplet has the effect to transfer a certain momentum to the blade and so exciting it. As indicated above, the oil spray (e.g., emitted through a nozzle) may be located in one or more different circumferential locations (which may be adjustable) and may be located in such a way to transfer momentum at any radial section of the blade.

As may be appreciated, such a test set-up as shown in FIG. 1 allows for having very high signal-to-noise ratios. For instance, as may be appreciated, a high signal-to-noise ratio is provided by using a liquid (e.g., oil), which, compared to a gas, provides much higher forces (e.g., the liquid is associated with a much higher mass or density (e.g., at the same volume flow rate) compared to a gas; also, compared to a gas, a liquid has a much lower divergence from the nozzle).

Various embodiments of the present invention provide for characterizing the excitation in the case of a liquid (e.g., oil) spray. As understood, embodiments of the present invention include methods for characterizing such a liquid (e.g., oil) excitation, such as representing such an excitation in terms of a force as a function of time and/or in terms of frequency components (e.g, harmonic content of the excitation). The ensuing description sets forth an illustrative model for characterizing the excitation force in accordance with some embodiments of the present invention, and those skilled in the art will understand that that aspects and embodiments of the present invention, including embodiments directed to the excitation analysis/modeling itself as well as embodiments employing the excitation force characterization (e.g., in terms of time dependence and/or frequency components) are not limited to this particular illustrative model.

Figure 2B:
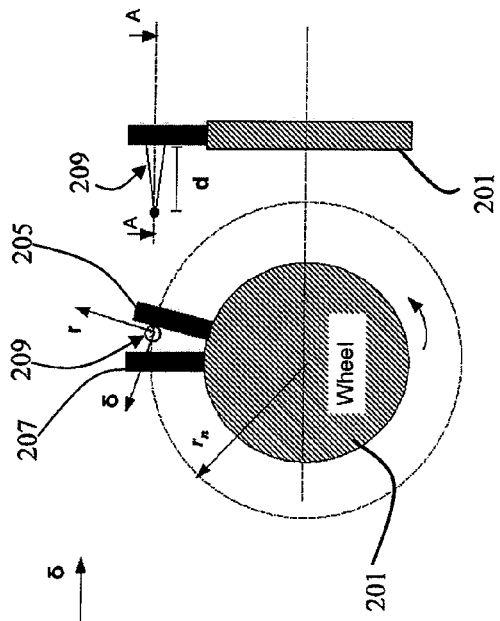
FIGS. 2A-2C schematically depict an illustrative model, in accordance with some embodiments of the present invention, for obtaining the force transferred by the impact of the droplets of a spray with a blade of a rotating wheel.
Figure 2A:
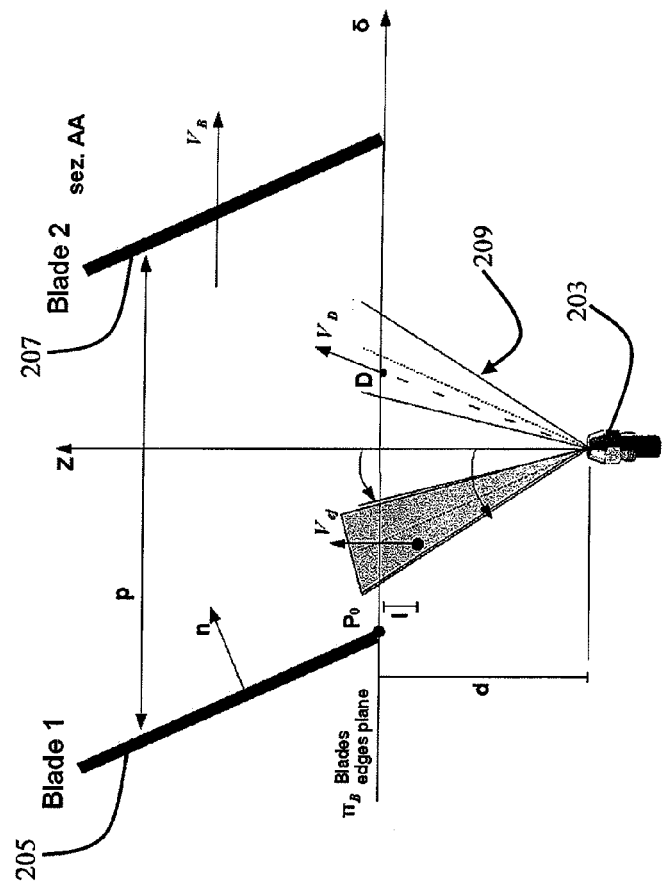
Figure 2C:
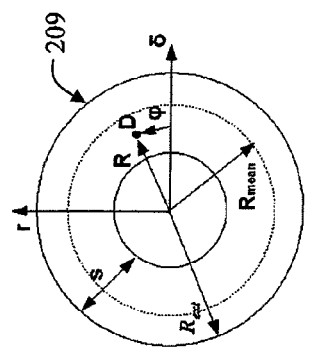

FIGS. 2A-2C schematically depicts an illustrative model, in accordance with some embodiments of the present invention, for obtaining the force transferred by the impact of the droplets of a spray 209 emitted by nozzle 203 with a blade of wheel 201 rotating at N revolutions per minute (rpm).

In this model, a blade (e.g., blade 205) is modeled by a plane of normal n ($n_r$, $n_\delta$, $n_z$) of equation:

$$\pi_b : \vec{n} \cdot (\vec{P} - \vec{P}_0) = 0 \qquad (1)$$

FIG. 2A schematically depicts what may be referred to as the planar development of the section of the blades (e.g., blades 205 and 207, also referred to in the drawings as Blade 1 and Blade 2, respectively) row at constant radius $r_n$ equal to the radius at which the nozzle 203 is positioned. In this plane $\vec{P}_0$ is the point of intersection of the line describing the blade and the line describing the plane tangential to the blade's edges in axial direction ($\pi_B$). Since the blade is rotating, the point $\vec{P}_0$ moves with a velocity $\vec{V}_B$ in the tangential direction ($\hat{e}$):

$$\vec{V}_B = \frac{N \cdot 2\pi}{60} \cdot r_n \hat{\delta} \quad (2)$$

A simplified model, which those skilled in the art will understand as being suitable for many implementations, considers the spray as a whole of droplets ejected from the nozzle. Each droplet exits the nozzle with an axial velocity $\vec{V}_{ej}$:

$$\vec{V}_{ej} = CN \cdot \sqrt{\frac{2 \cdot \Delta p}{\rho}} \quad (3)$$

When the droplet reaches the plane of blades edges its velocity is:

$$\vec{V}_D = \frac{1}{\sqrt{r_D^2 \delta_D^2 + z_D^2}} \left( \frac{r_D^2 V_{ej}}{z_D}, \frac{\delta_D^2 V_{ej}}{z_D}, z_D V_{ej} \right) \quad (4)$$

From this point the droplet enters the area of possible impacts with the blade. In this illustrative embodiment of a spray impact model, the case of a type H (hollow cone) nozzle is represented. The intersection of the spray pattern with the plane $\pi_B$ is schematically depicted in FIG. 2A from the sez. AA perspective, and in FIG. 2C in the $\pi_B$ plane (showing the spray pattern intersection having an annular shape of width s, mean radius $R_{ext}$, and extending to radius $R_{ext}$). The analysis of the impact considers the droplets moving from this plane into the area of possible impact. If one droplet is at a given axial distance l from the plane $\pi_B$, it will reach the plane in a time $$t' = \frac{l}{V_{ej}} \quad (5)$$

The droplet position D can be identified with its radial and curvilinear coordinates (R and φ) on the plane $\pi_B$ together with its axial distance from $\pi_B$, l. Each droplet can be identified in the blade system as follows:

$$D = (r_D, \delta_D, z_D) = (r_n + R \sin(\phi), R \cos(\phi), l) \quad (6)$$

or alternatively, given equation (5), as follows:

$$D = (r_D, \delta_D, t') = (r_n + R \sin(\phi), R \cos(\phi), t') \quad (7)$$

In considering the occurrence of an impact event between a droplet and a blade, the total time T for the possible impacts to take place is considered. This time, T, is simply the time needed for the blade to cover a distance equal to the sum of blade pitch and the total spray impression dimension on the plane $\lambda_B$:

$$T = \frac{p + 2R_{ext}}{V_B} \quad (8)$$

The time t' needed by each droplet to reach the plane $\pi_B$ is then randomly chosen in the interval [0,T]. While the droplet travels from its initial position to the plane $\pi_B$, also the base point $\vec{P}_0$ of the plane representing the blade, moves tangentially as follows:

$$\vec{P}_0 = \vec{P}_{00} + \vec{V}_B t' \quad (9)$$

where $\vec{P}_{00}$ is the initial position of $\vec{P}_0$:

$$\vec{P}_{00} = (r_n, -(2R_{ext} + p), d) \quad (10)$$

At the instant t' the droplet stands on the plane $\pi_B$ and its coordinates are then:

$$D_0 = (r_D, \delta_D, d) \quad (11)$$

At this point, counting the time t" from the instant when the droplet leaves the plane $\pi_B$, the droplet position is given by:

$$\vec{D} = \vec{D}_0 + \vec{V}_D t'' \quad (12)$$

while the base point $\vec{P}_0$ becomes:

$$\vec{P}_0 = \vec{P}_{00} + \vec{V}_B (t' + t'') \quad (13)$$

The condition for impact is finally represented by equation (1) with $\vec{P} = \vec{D}$:

$$\vec{n} \cdot (\vec{D} - \vec{P}_0) = 0 \quad (14)$$

Substituting equations (12) and (13) into equation (14), the equation for the impact time t" is:

$$\vec{n} \cdot (\vec{D}_0 + \vec{V}_D t'' - \vec{P}_{00} - \vec{V}_B (t' + t'')) = 0 \quad (15)$$

Inverting equation (15), it is possible to find the time elapsed from the instant when the droplet enters the area of possible impacts and the impact itself $$t'' = -\frac{\vec{n} \cdot (\vec{D}_0 - \vec{P}_{00} - \vec{V}_B t')}{\vec{n} \cdot (\vec{V}_D - \vec{V}_B)} \quad (16)$$

The total time for each droplet under consideration to impact the blade is then:

$$t = t' + t'' \quad (17)$$

The position of the impacted droplet $\vec{D}_{im}$ is given by substitution of equation (16) into equation (12).

Figure 3:
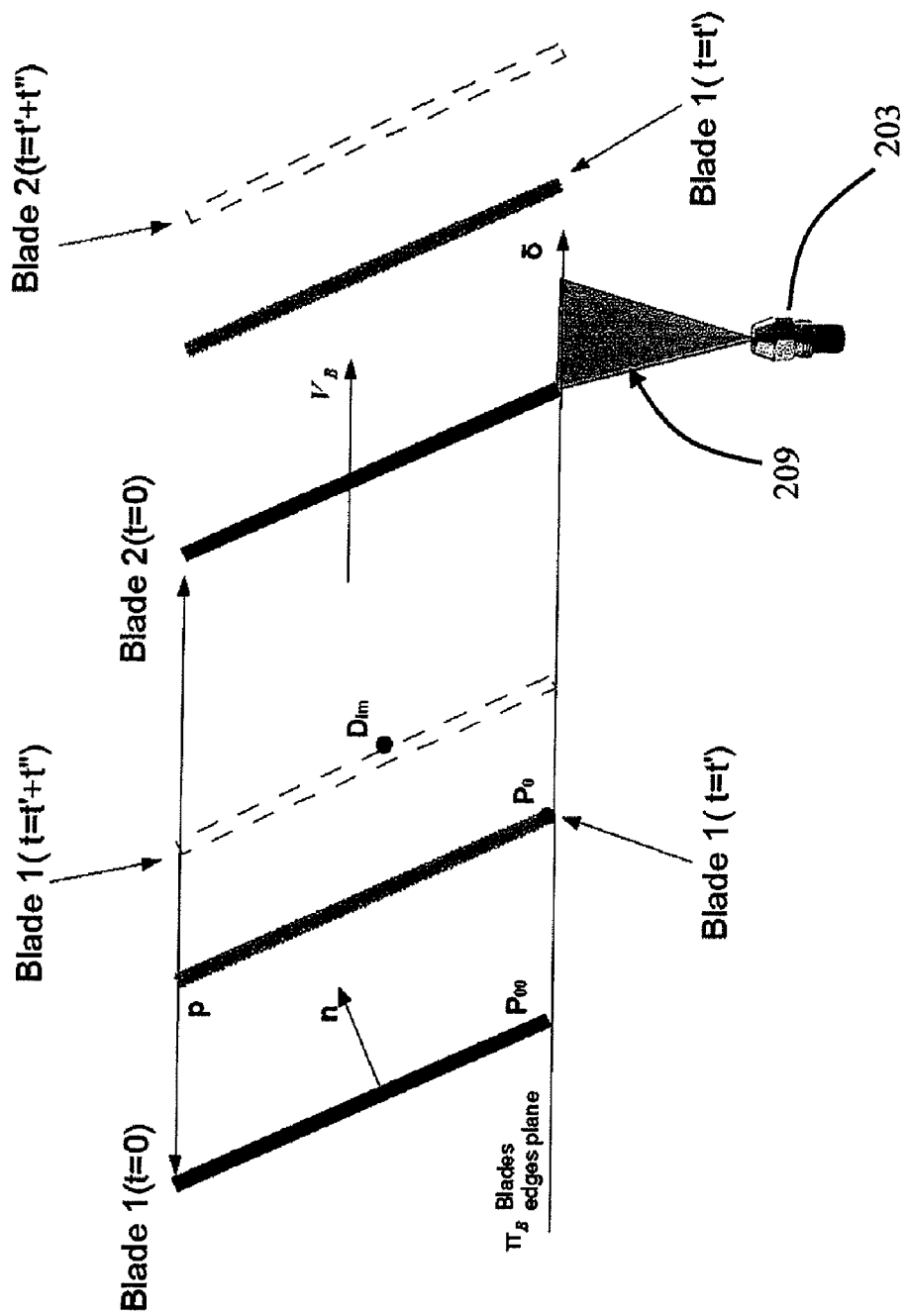
FIG. 3 schematically depicts the planar development of blades at different time values, in accordance with some embodiments of the present invention.

Clearly, in this illustrative model, not all the impacts are possible or have interest. More specifically, in this illustrative embodiment, the impacts of interest are those occurring in the blade channel between the first and the second blade at time t', as represented in FIG. 3, which schematically depicts the planar development of blade 205 and blade 207 at times 0, t', t'+t".

The situation in the other channel will then be equal. This condition is verified when the following is true:

$$[\vec{n} \cdot (\vec{D}_{im} - \vec{P}_0)] \cdot [\vec{n} \cdot (\vec{D}_{im} - (\vec{P}_0 + p\hat{\delta}))] < 0 \quad (18)$$

Moreover the radial and axial coordinates of the point of impact must be such that the impact occurs physically on the blade:

$$z_{D_{im}} < d + a$$

$$r_{D_{im}} < r_{tip} \quad (19)$$

where a is the axial length of the blade while $r_{tip}$ is the tip radius.

In accordance with this illustrative model according to some embodiments of the present invention, the droplets are all assumed to have the same diameter. This diameter is taken equal to the Soutern-mean diameter $d_{32}$. As known to those skilled in the art, different correlations are available on literature. For purposes of the illustrative model presented herein in accordance with some embodiments of the present invention, the correlation from Hiroyasu and Kadota is used (see, e.g., H. Hiroyasu and T. Kadota, "Fuel Droplet Size Distribution in Diesel Combustion Chamber," SAE Paper 740715 (1974)):

$$d_{32} = A \cdot \Delta p^{-0.135} \rho_a^{0.121} Q^{0.131} \tag{20}$$

where $d_{32}$ is in µm, A is a geometrical constant depending on the nozzle (equal to 18.82 for a 28 Gal nozzle for which modeling results are presented herein for purposes of illustration and by way of example), $\Delta p$ is the mean effective pressure differential across the nozzle (MPa), $\rho_a$ is the ambient air density (kg/m$^3$), and Q (mm$^3$/s) is the volumetric flow rate. It will be understood by those skilled in that art that while the correlation proposed was developed for diesel injectors, it is more than sufficient for many modeling implementations in accordance with various embodiments of the present invention.

The mass of each droplet is then:

$$m_D = \pi \frac{d_{32}^3}{6} \cdot \rho_{oil} \tag{21}$$

The mass flow rate ṁ (which is well known from characterization of the nozzle) is linked to the time T and the total number M of droplet ejected in that time by the following relation:

$$\dot{m} = \frac{M \cdot m_D}{T} \tag{22}$$

from which:

$$M = \frac{\dot{m} \cdot T}{m_D} \tag{23}$$

The droplets are assumed to have a given distribution in radial direction and coherent distribution in circumferential and axial directions as explained in the appendix. If $m_R$ is the number of particles in the radial direction, the number of particles in circumferential $m_\varphi$ and axial directions $m_z$ are:

$$m_\varphi = \text{round}\left(m_R \frac{2\pi R_{mean}}{s}\right) \tag{24}$$

$$m_z = \text{round}\left(m_R \frac{T \cdot V_{ej}}{s}\right) \tag{25}$$

where $R_{mean}$ and s are respectively the mean radius and width of the spray pattern on the plane $\pi_B$. Consequently the total number of droplets considered is:

$$M = m_R \cdot m_\varphi \cdot m_z = m_R^3 \cdot \left(\frac{2\pi R_{mean}}{s}\right) \cdot \left(\frac{T \cdot V_{ej}}{s}\right) \tag{26}$$

Inverting equation (26), once $m_R$ is known (clearly rounding at the nearest integer), $m_\varphi$ and $m_z$ are also known by equations (24) and (25).

Summarizing, the droplet travels with velocity $\vec{V}_D$ spreading from the nozzle. In the meanwhile, the blade travels in the tangential direction with velocity $\vec{V}_B$. Accordingly, at the impact the relative velocity between the blade and the droplet is:

$$\vec{V}_{imp} = \vec{V}_D - \vec{V}_B \tag{27}$$

DesJardin et al. formulated, based on energy conservation principles, an impact model for a droplet impinging on a surface. (See, e.g., "A Droplet Impact Model for Agent Transport in Engine Nacelles," Proceedings of the 12$^{th}$ Halon Options Technical Working Conference (HOTWC), NIST SP 984, pp. 1-12 (2002)). One of the results of their work is a criterion to analyze the behavior of the droplet after the impact. After impact the droplet can either rebound or stick to the surface. In particular, referring to DesJardin et al. for additional details, the criterion essentially states that, if the surface energy of the at-impact state (where the droplet is assumed to be spread at the surface in a roughly pancake shape) is less than the energy dissipated during impact, then the droplet sticks to the surface.

Considering DesJardin et al.'s analysis in connection with the droplet characteristics predicted by the previous presented model and the blade velocities typically encountered in a typical wheel box test, for such conditions, generally rebounding does not occur. Accordingly, under such conditions, because the impact can be analyzed like a complete inelastic impact, it is easier (e.g., than under conditions that include incomplete inelastic impacts) to compute the forces developing in the impact.

Figure 4:
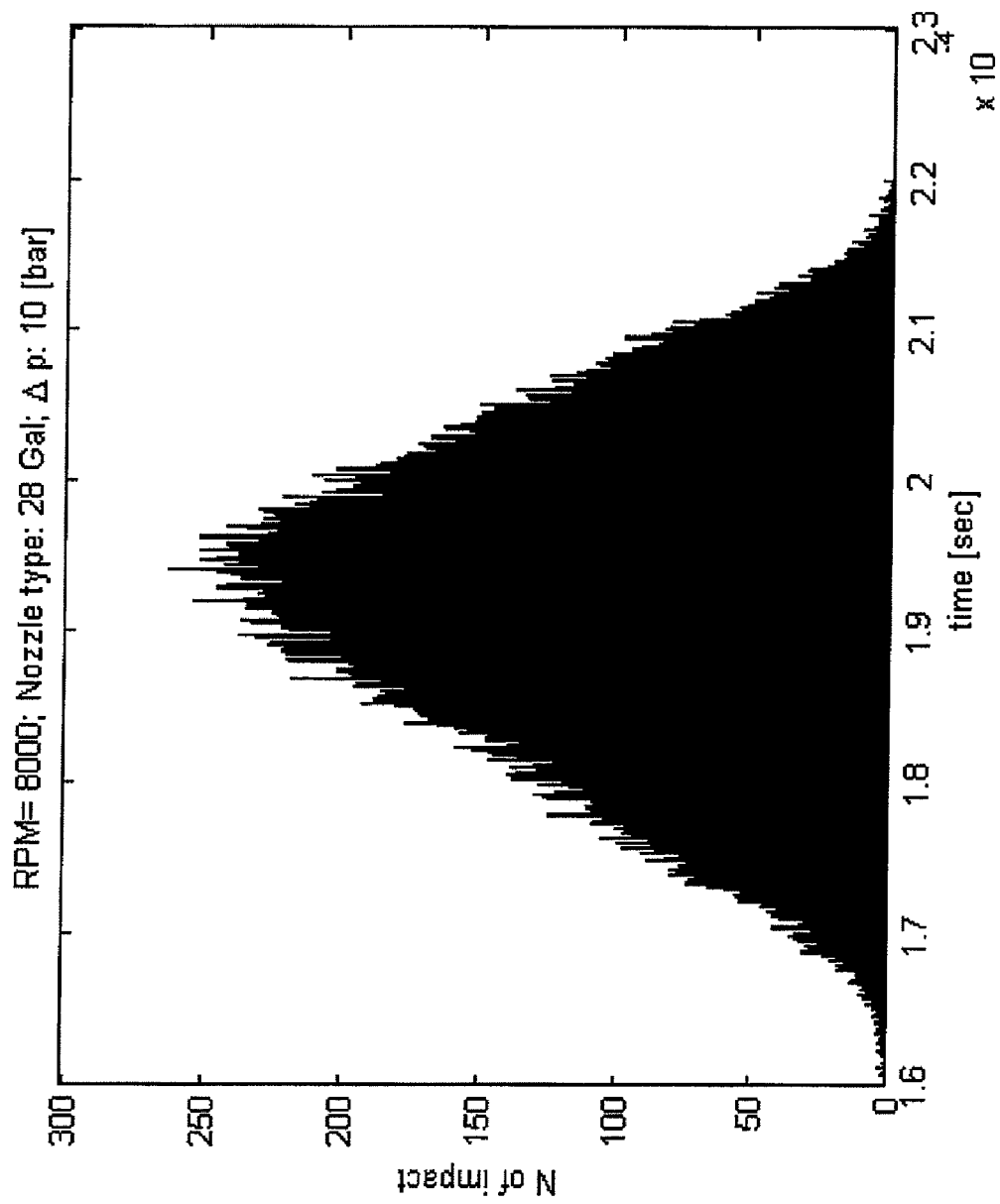
FIG. 4 depicts an illustrative histogram of impacts in accordance with modeling an excitation force, in accordance with some embodiments of the present invention.

Each of the M droplets under consideration impacts the blade after a given time (equation (17)). These times can be collected in a histogram in order to have the number of impacts N happening in a certain interval of time [t,t+dt]. For purposes of illustration, by way of example, a histogram of impacts considering a 28 Gal nozzle with a pressure head of 10 bar mounted at $r_n$=878.5 [mm] and d=10 [mm] on an L0 stage rotating at 8000 RPM is presented in FIG. 4.

The force transferred to the blade, from conservation of momentum is then simply:

$$\vec{F}(t) = \frac{m_D \sum_{i=1}^{N} \vec{V}_{imp,i}}{dt} \tag{28}$$

where the index i individuates the single particle impacting in the interval of time [t,t+dt]. FIGS. 5A-C show the force components in the {r, δ, z} reference system for the illustrative case represented by the histogram of impacts depicted in FIG. 4.

Figure 6:
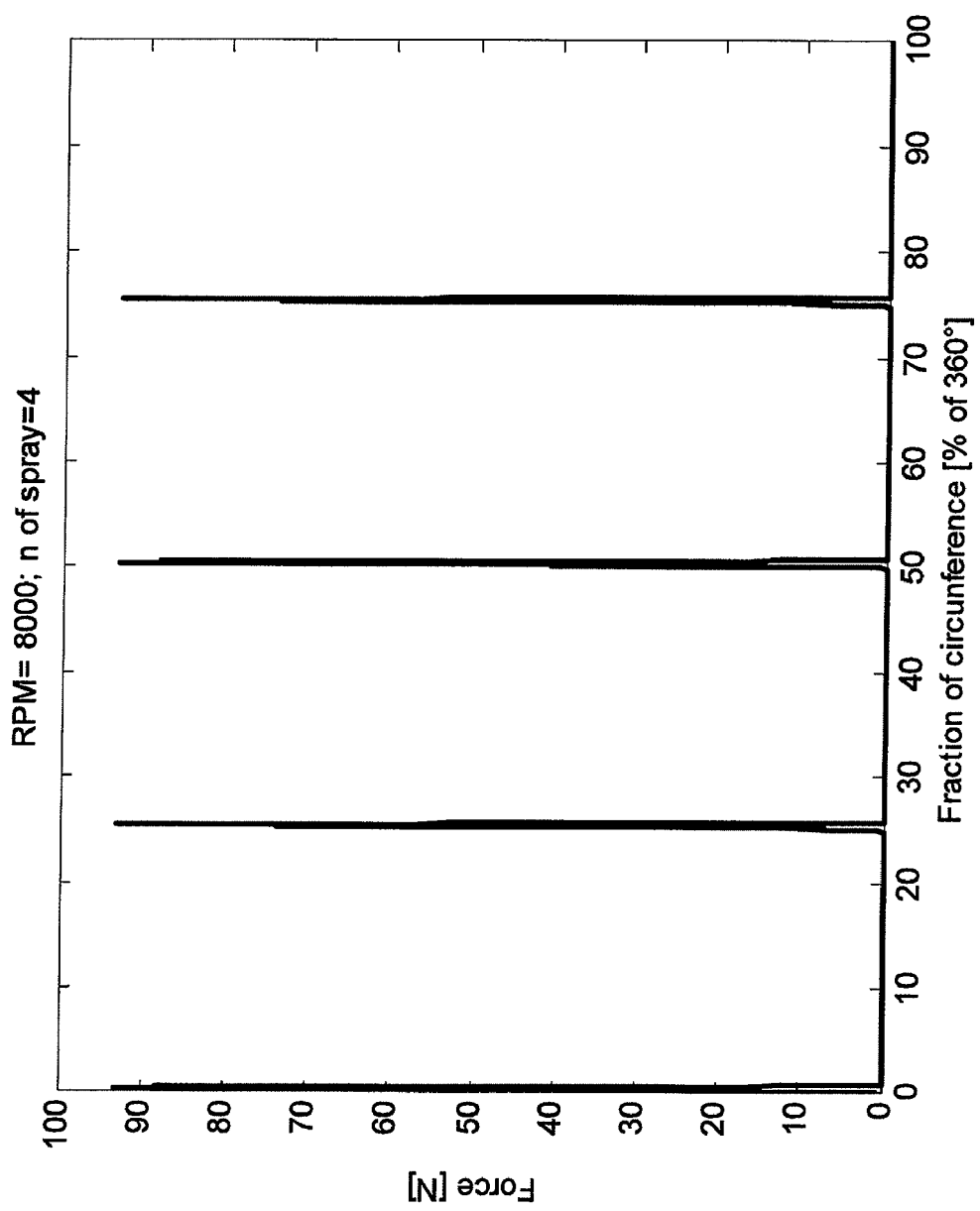
FIG. 6 shows the tangential force transferred to one blade in 360° of rotation by four nozzles of the same size, uniformly distributed around the circumference at the same radial location, under the same conditions for the illustrative case of FIGS. 5A-C, in accordance with some embodiments of the present invention.
Figure 7:
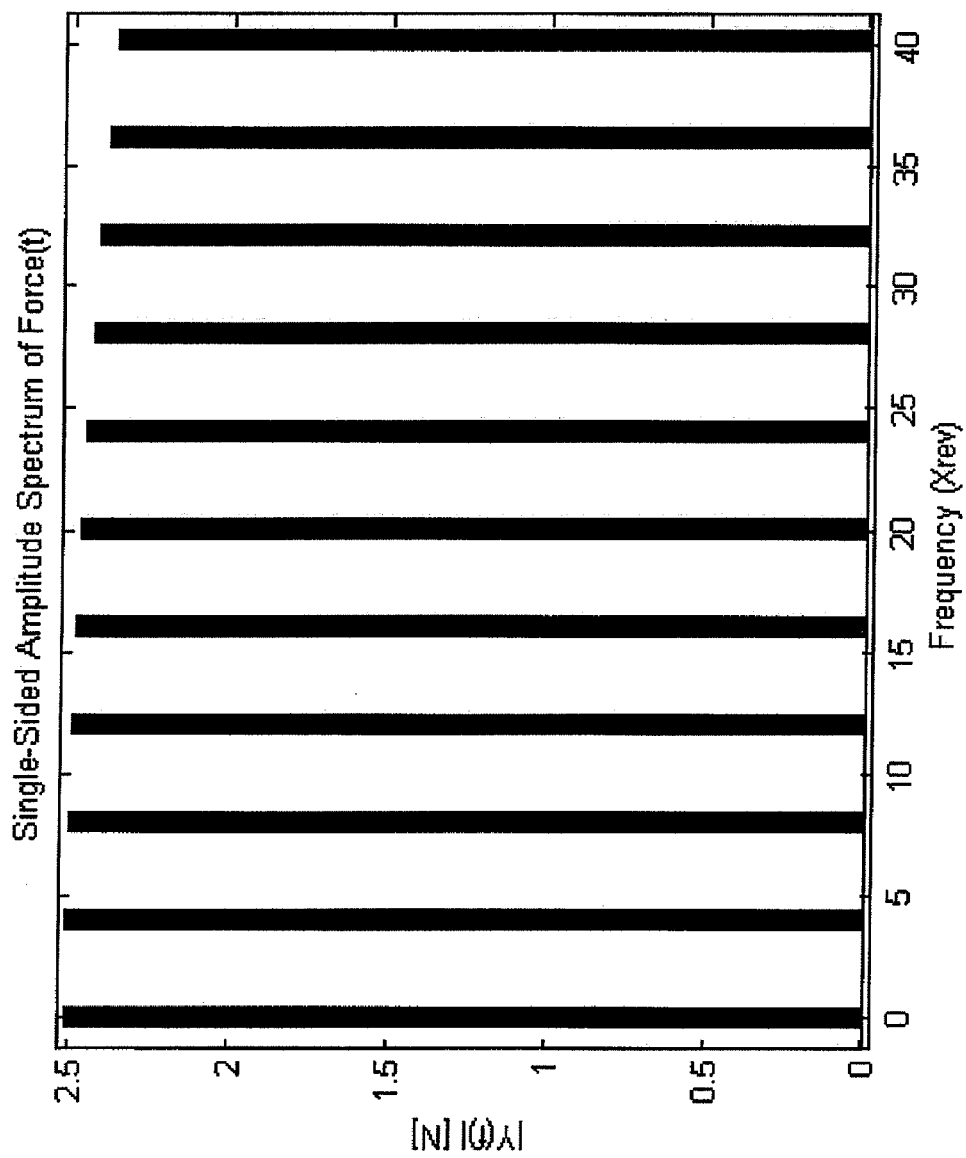
FIG. 7 shows the force decomposition for FIG. 6 in terms of its Fourier components at different XRevs, in accordance with some embodiments of the present invention.
Figure 8:
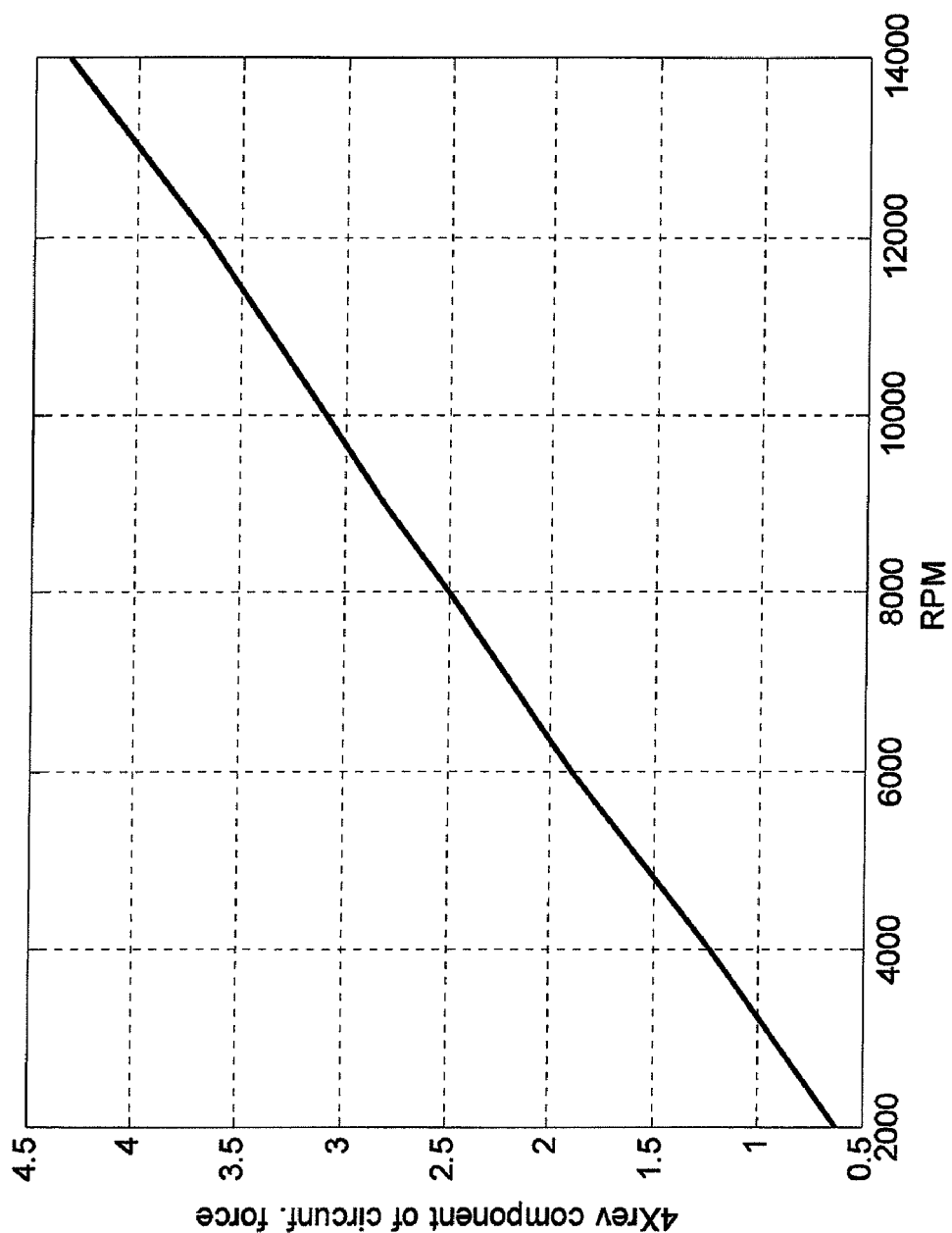
FIG. 8 shows the 4XRev component of the force as function of the rotational speed, corresponding to the illustrative conditions for the illustrative case model of FIGS. 6 and 7, in accordance with some embodiments of the present invention.

Once the force transferred by the impacts of the droplets ejected by one nozzle to the blade is known as function of time, it is possible to study the force diagram for any distribution of nozzles around the wheel. By way of example, FIG. 6 shows the tangential force transferred to one blade in 360° of rotation by four nozzles of the same size, uniformly distributed around the circumference at the same radial location, under the same conditions for the illustrative case of FIGS. 5A-C, while FIG. 7 shows the force decomposition for FIG. 6 in terms of its Fourier components at different XRevs. For this illustrative case, FIG. 8 shows the 4XRev component of the force as function of the rotational speed, clearly demonstrating that the 4 XRev component increases linearly with the rotational speed, a relationship which is also exhibited (not shown) by the other XRev components of the force.

In accordance with some embodiments of the present invention, such modeling of the excitation may be used in a variety of ways, such as for controlling the nozzle parameters to generate a desired excitation. Illustrative degrees of freedom regarding the design of the excitation include (i.e., but are not limited to) the following: number of oil spray nozzles directed at a given stage; oil spray nozzles nominal size and spray type; pressure drop acting on the nozzle; circumferential location of the nozzles; axial distance of each nozzle; and radial location of each nozzle. A dedicated code can handle the above parameters in order to quantify the resulting excitation. An optimization routine can be used to design the excitation as function of the design needs (e.g., customer needs). For example, design needs, desires, or requests (e.g., based on customer needs) may involve the possibility of exciting a particular blade\wheel modal shape with a well-known excitation in order to coherently simulate real operating conditions. Such needs, desires, or requests may be provided based on excitation modeling according to embodiments of the present invention.

In accordance with some embodiments, based on such excitation modeling, the excitation force imparted by the fluid ejected by the nozzles may be controlled so that the excitation intensity is a desired function of the rotation speed. For example, it may be desirable for certain tests to control the excitation force such that it is approximately equal for different rotation speeds (e.g., a constant excitation force as a function of rotation frequency), such as rotation speeds at which different modes are excited. Additionally, as further discussed below, such excitation modeling provides for input-output analysis of the system dynamics (e.g., to determine damping factors and/or other mechanical properties of the system) to more accurately and/or more fully characterize the system. For instance, such excitation modeling allows for different measured system responses (e.g. at different frequencies) to be analyzed relative to their respective excitation forces (e.g., normalizing responses relative to their excitations).

Methods and systems according to various embodiments of the present invention also provide for executing a so-called "tonal analysis" on the signals acquired from the strain gauges during a test. More specifically, in some embodiments, post-processing code is operable to analyze the strain gauge signals to run a tonal analysis to study the different modal blade\wheel shape resounding during the test. That is, tonal analysis provides for determining the modal shape/nodal configuration among the blades, and, according to various embodiments of the present invention, may involve using the phase information of the strain gauge response to identify a coupled mode.

Figure 9:
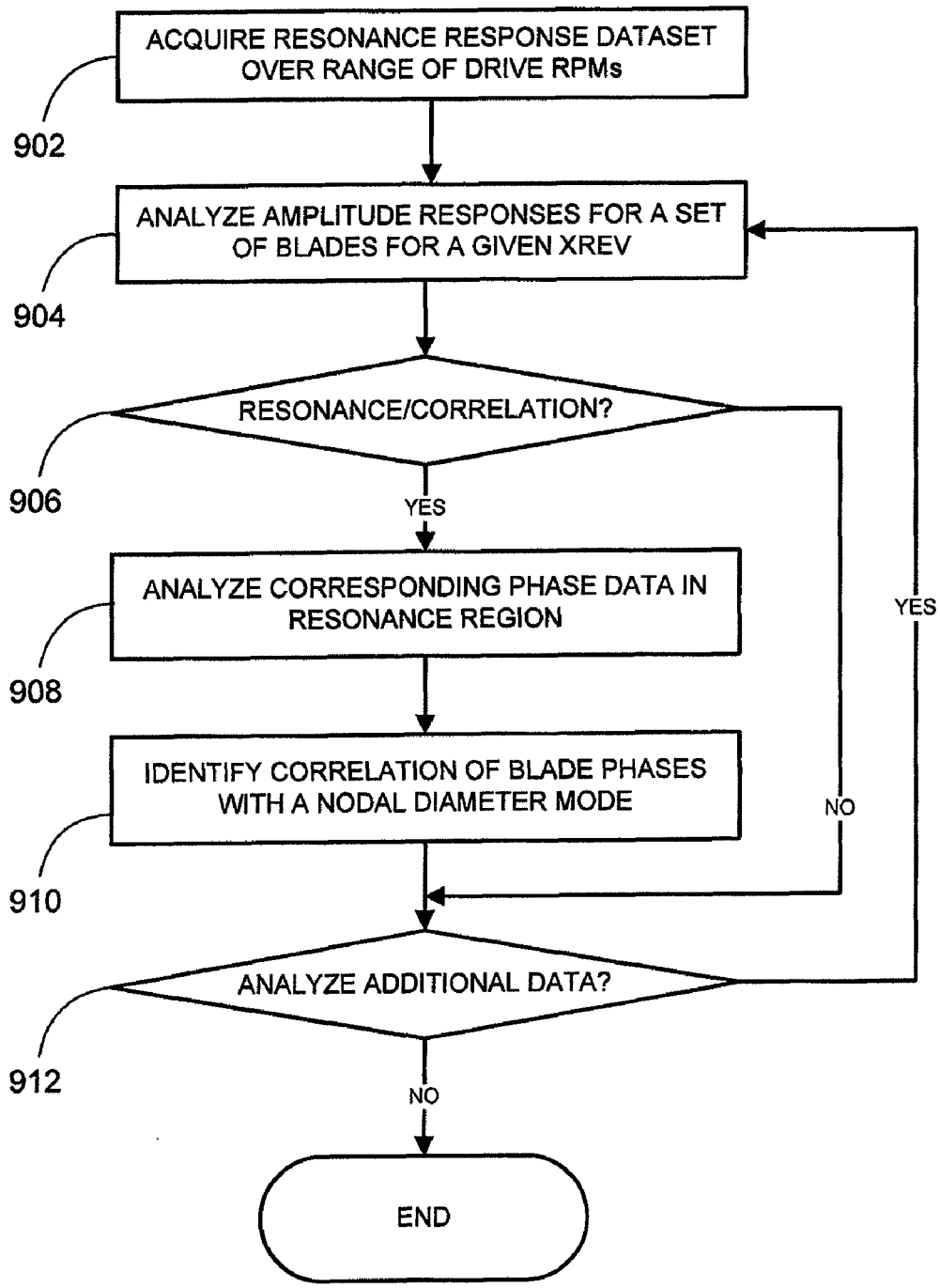
FIG. 9 is a flowchart depicting illustrative steps for performing tonal analysis, according to some embodiments of the present invention.

FIG. 9 is a flowchart depicting illustrative steps for performing tonal analysis according to an embodiment of the present invention. After one or more turbine blade stages have been tested to acquire strain gauge measurements for two or more blades (preferably, for a number of blades to provide sufficient data for identifying modal diameters that may be of interest) over a range of RPMs (step 902), the corresponding dataset may be stored in terms of the amplitude (magnitude) and phase of the response (e.g., based on FFT calculation) with respect to each engine order (i.e., XRev).

In step 904, for a given engine order ("XRev"), for each of a set of blades for which data has been acquired (e.g., for two or more blades, and preferably a sufficient number for assessing a nodal diameter of interest), the strain gauge response (e.g., FFT magnitude) over a narrow band of RPMs corresponding to a possible resonance region is analyzed to confirm whether the blades may be in a coupled resonant mode. For instance, this analysis may include confirming that (i) each of the blades is in resonance for the given XRev in the RPM range of interest, as may be determined, for example, based on whether the amplitude signal for each blade has a characteristic resonance peak (e.g., based on an amplitude threshold and/or amplitude signal shape, such as the ratio of the peak to the full-width at half maximum, etc.), and (ii) the resonances may be considered as being coupled (e.g., based on the respective frequencies of the peak amplitudes being at or near the same frequency). If the blades are determined as not being in a coupled resonant state (step 906), then it is determined whether additional data will be analyzed (step 912) (e.g., based on user input and/or on whether additional data for possible analysis is available).

Alternatively, in step 906, if the blades are determined as likely being in a coupled resonant state, then the corresponding phase data for each of the blades is analyzed (step 908) to identify or otherwise extract phase values for each of the blades. In accordance with some embodiments, this analysis includes determining whether there is coherence among the phase data in the resonance region. Such a coherency assessment may, for example, be implemented by selecting the phase data for one of the blades as the reference phase data, and subtracting this reference phase data from the phase data for each of the other blades over a range of RPM values in the neighborhood of the resonance (e.g., within and without a window, such as may be defined by the width of the FFT amplitude resonance) signal of the resonance. Coherency among the phases may be inferred, for example, by each of these phase difference signals demonstrating a well-defined phase signal within the resonance window (e.g., relative to a noisy, rapidly varying, or random phase variation, which may be exhibited outside the resonance window). For each of the blades, a phase value for the resonance may be determined as the corresponding FFT phase value (or as the phase value from the difference signal, in which case the reference blade phase is zero) at the resonant frequency (e.g., as determined according to the peak amplitude).

The phase values extracted for the blades are then analyzed to identify a nodal diameter associated with the resonance. In accordance with an embodiment of the present invention, the nodal diameter for the coupled mode may be determined according to the correlation of the phase data with a theoretical phase distribution for a given nodal diameter, wherein the theoretical phase distribution may be represented according to the following equation:

$$\phi_t(n) = \left(\frac{360 * ND}{N_b}\right) \cdot (n - 1) \qquad (29)$$

where $\phi_t$ is the theoretical phase, ND is the nodal diameter number, $N_b$ is the total number of blades, and n is an integer from 1 to $N_b$ identifying the nth blade. As may be understood, the first blade (i.e, n=1) is presumed to have a phase of zero, and corresponds to the reference blade to which the relative phases and the relative blade number of the other blades are referenced. Such an analysis may be performed in any of a variety of ways, such as by comparing the measured phases to calculated theoretical phases for each of a number of nodal diameters, by performing a best-fit (e.g., least-squares) calculation to extract ND, etc. As may be understood by those skilled in the art, and as indicated above, identifying a given nodal diameter number requires data corresponding to a minimum sufficient number of blades. Otherwise, an "only necessary" condition may be identified.

After the nodal diameter analysis for the given dataset has been performed, additional data (e.g., corresponding to other XRevs) may be analyzed (e.g., step 912) according to the described tonal analysis to identify additional modal configurations excited during the test.

As will be understood from the foregoing, in accordance with alternative implementations, it is not necessary to confirm that each of the blades exhibits a resonance by analyzing each of their respective amplitude signals (e.g., as per step 904) before analyzing the phase data. For instance, with or without reference to the amplitude signals for one or more blades, the phase data of corresponding XRevs for different blades may be analyzed to identify coherent regions, from which respective phase values may be extracted and nodal diameter matching evaluated. Moreover, in some implementations, it is alternatively or additionally not necessary to assess the coherency of the phase data itself before processing the phase data to extract phase values that may be used to identify a correlation of the blade phases with a nodal diameter because, for example, whether or not (or the degree to which) the extracted phase values for the different blades results in meaningful or significant correlation with a nodal diameter will itself be indicative of whether the blades correspond to a coupled mode. Yet, in accordance with some implementations, assessing each of the amplitude signals for resonance (e.g., step 904) and/or assessing the coherence of the phase data within the resonance window before extracting phase values therefrom, provides for additional confirmation of the existence of a coupled mode.

It may be understood, in accordance with the excitation model presented herein, that because the excitation model provides for decomposing or otherwise representing the applied excitation in terms of components corresponding to the measured responses at different response frequencies, the dynamics of the measured system may be characterized according to input-output techniques being applied to the measured data. Accordingly, according to some embodiments of the present invention, parameters other than the standard output-output parameters may be extracted from the test data. For example, the correlation between the levels of blade vibration and the forcing function may be determined. That is, in accordance with some embodiments of the present invention, by relating the response of the system (e.g., not only in terms of amplitude, but also in terms of phase) with the quantification of the excitation, damping factors, force-response correlations, etc., associated with each modal form may be determined. For example, in some implementations, a commercially available modeling program (e.g., ANSYS) may be used to implement a model that uses an excitation force calculated according to the model set forth herein as an input, and determines a damping factor as a parameter that is adjusted (e.g. optimized) to provide the output characteristics measured during the wheel-box test (e.g., a best-fit estimate). In accordance with some embodiments of the present invention, such information (e.g, damping factors, force-response correlations, etc.) provided by input-output analysis provides for predicting response in real operation by scaling the wheel-box response with simulated aerodynamic forces.

In addition, it is noted that most output-output algorithms make a certain set of hypotheses or assumptions to extract model parameters. Among others, an important hypothesis/assumption is the linearity of the system. In more detail, these methods typically assume that the system characteristic parameters are independent of the level of excitation. In real machines, however, there are myriad sources of non-linearity, and so the reliability of this linearity hypothesis should be at least verified and/or the degree of non-linearity assessed for applying these output-output techniques. As will be understood by those skilled in the art, according to some embodiments of the present invention, this can now be assessed.

The following example is provided to illustrate some embodiments of the present invention and features and advantages thereof, and is not intended to limit the present invention. As will be understood from the results discussed below, implementations of the present invention provided for deeply characterizing a turbine stage in terms of modal analysis, natural frequencies, wheel modal form (diametral nodes configurartion), blade modal form (bending, axial, torsional) and also for measuring the damping factor associated to the different modal shape.

More specifically, the below presents some illustrative results obtained from a wheel-box test, wherein the experimental set-up included full-scale wheels for an HS8 low pressure stage installed in a vacuum over-speed bunker of a test set-up similar to that schematically depicted in FIG. 1. This set-up provided for exciting the blades with N oil-fed nozzles (f excitation=N×Rev and multiples), regulating the mass flows of each of the nozzle sprays by adjusting inlet pressure and nozzles diameter, and varying the rig speed varied from 0 to 125% to capture all the modes in the operative range. Additionally, the excitation force was analytically modeled, such as in accordance with the modeling described hereinabove.

The four low-pressure stages under analysis were instrumented with 50 high bandwidth strain gauges. The position of the strain gages was chosen with the use of a finite element (FE) model in order to detect all the modes of interest with an adequate sensitivity and all sensors were eventually routed to a telemetry transmission box placed at the shaft end, which transmitted the strain gauge signals to a data acquisition system. The telemetry system used for this test was a Frequency Modulation type by Datatel, which allowed the entire measurement chain to perform with a noise level below 0.2 µstrain throughout the whole frequency domain. This lead to high quality measurements, which permitted appreciating all the vibratory modes, also out of resonance.

The data acquisition system collected both slow-variable (static) parameters (e.g., jet system oil pressure, temperatures, etc.) and dynamic parameters (strain gauge signals). The static system was mainly a Datalogger Agilent 34970 connected via GPIB to a PC, and the acquired data was shared with the dynamic system by means of a custom software routine. The system was able to backup data on AIT tape with a 20 Khz bandwidth, and to acquire in real time in the frequency domain a fast Fourier transform (FFT) every 200 ms for each channel. For the FFT, the following settings were used: data block size=2048 pt, sampling Rate=12.8 Ksa/s, which means 5 KHz bandwidth with a 6 Hz resolution. If higher resolution was required, it was always possible to re-sample the data from AIT tapes with different settings. All channels were synchronized both in real time and in playback; the phase lag between channels was less than 1 degree. FFT data was then stored and processed via software to Campbell diagrams.

Figure 10:
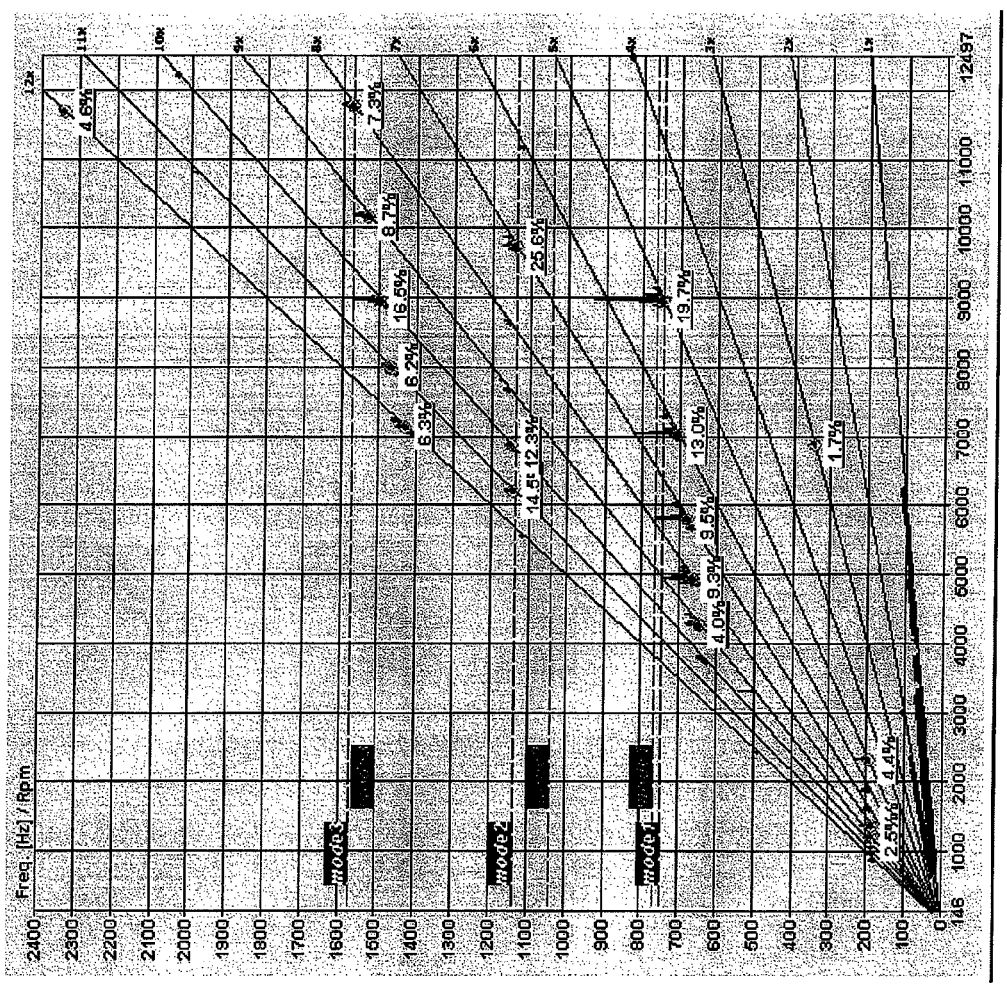
FIG. 10 shows the L0 blade (last stage) Campbell diagram for an experimental test performed in accordance with some embodiments of the present invention.

The main output of the Wheel box test is the Campbell diagram of the blade row. FIG. 10 shows the L0 blade (last stage) Campbell. Blade mode frequencies are detected where response peaks occur. At the crossing with engine orders ("XRev"), where the excitation due to the oil jet passing frequency (and harmonics) matches the blade coupled modes frequency, resonance takes place. This level of analysis normally allows determining the Campbell of the blade, but in order to assess the damping of the blade row further elaborations of the data are required.

Since in a Wheel Box test the intensity of the excitation (oil sprays) increases as a function of the rotating speed (for given oil mass flow), the resonant response at higher speed is expected to show higher values. However, the increase in speed also causes an increase in the contact forces between covers (and at the dovetails), thus a reduction of the friction damping, which might represent a further cause of response increase. Therefore, in order to correctly evaluate which part of the increased response is actually due to the lower damping, rather than to the simple increase of the excitation, and to compare the response of the blade at different speeds and conditions it is important to gain some insight on the excitation force and its frequency content.

In the past, the oil jet was simply modeled as a "square impulse" function. In accordance with some embodiments of the present invention, however, during these experiments, an attempt to describe the shape of the excitation on a more physical basis was made by the implementation of two models: one based on a Eulerian approach and another based on the Lagrangian approach (e.g., as described hereinabove). The models were used to determine the frequency content of the excitation for given test conditions (e.g., mass flow, rotating speed, nozzle type and stage geometry).

Figure 11A:
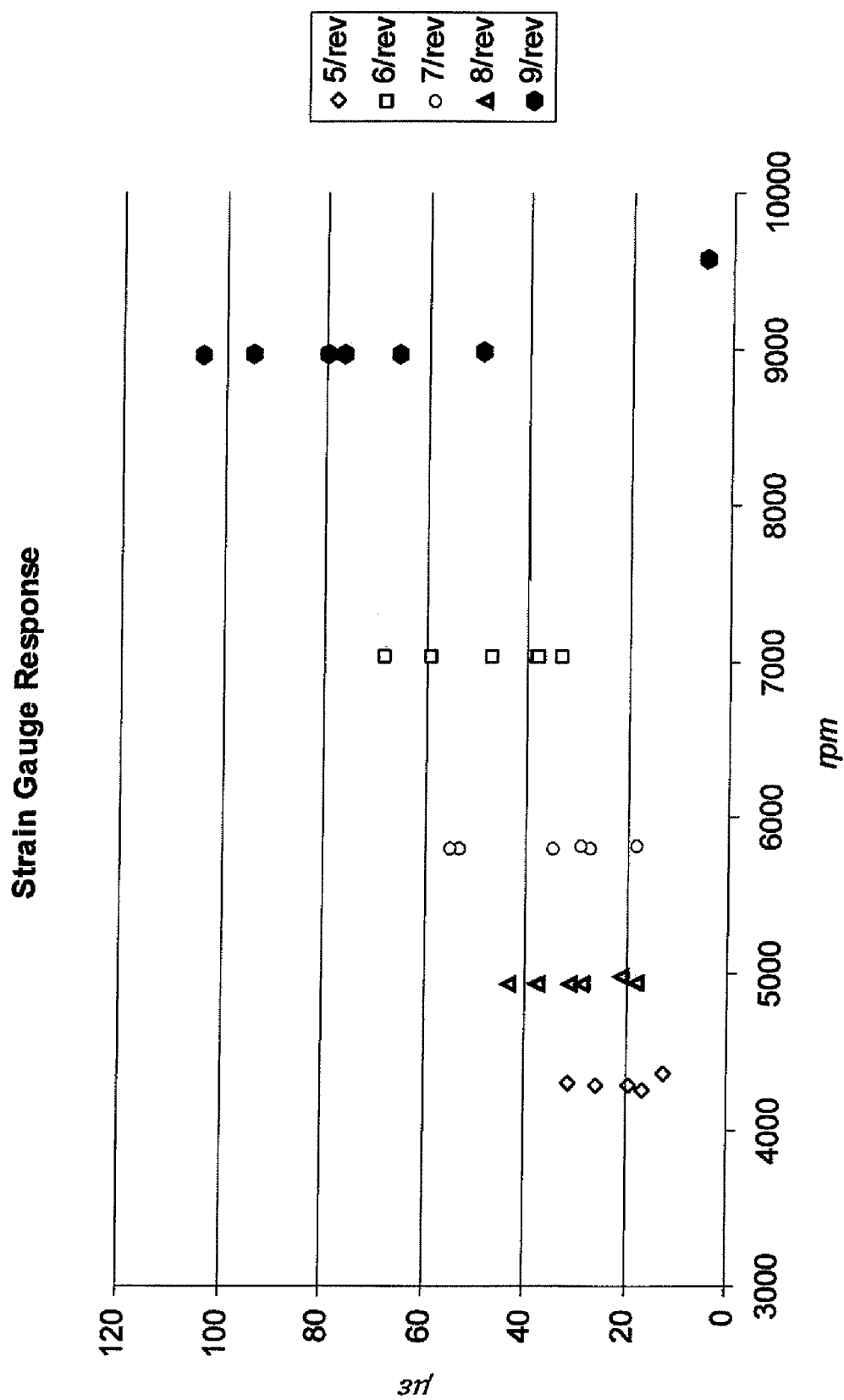
FIGS. 11A and 11B show the measured response and normalized measured response, respectively, for six different blades at five different crossings for an experimental test performed in accordance with some embodiments of the present invention.
Figure 11B:
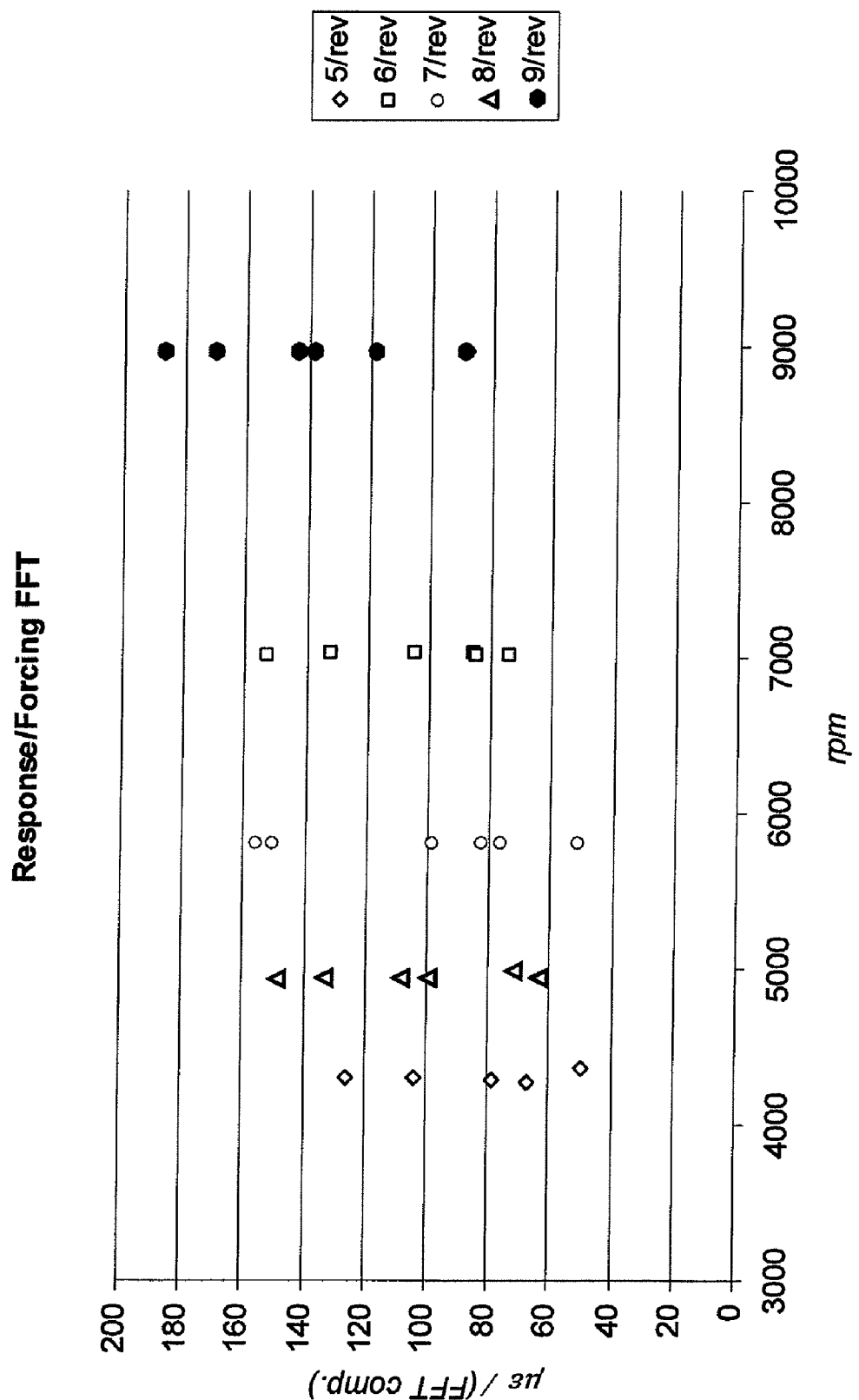

The diagram reported in FIG. 11A shows the measured response of six different blades at five different crossing (i.e., at different speeds). Because of mistuning effects there is a certain blade-to-blade response variability, but the increase in response amplitude is quite evident and the ratio between the average response at 5XRev and the average response at 9XRev is around 4. Using this representation of the experimental data, it is not possible to distinguish which part of the response increase is due to the excitation variation and which is due to the decrease of damping, which is expected at higher speed. When the same set of data is normalized through the excitation harmonic component determined in accordance with the modeling of the excitation, the effect of damping reduction is isolated. The normalized data, shown in FIG. 11B, shows a smoother trend, with the ratio between normalized average response at 5XRev and normalized average response at 9XRev being about 1.8, compared to about 4.0 for the unnormalized data (i.e., shown in FIG. 11A). Such a methodology has also been applied to compare the responses of different blades under a normalized excitation. In particular the response of a new steam turbine last stage blade has been compared with the response of an existing and proven one.

Coupled cyclic symmetry systems, like shrouded turbine blades, tend to behave like a single vibrating structure and thus to show cyclic symmetric modal solutions which can be seen as a "coupled mode", which has been well documented in, e.g., Singh, "SAFE diagram," Technology Report ST 16, Dresser-Rand Company (1984); and Singh et al. "SAFE Diagram-A Design Reliability Tool for Turbine Blading," *Proceedings of the Seventeenth Turbomachinery Symposium*, Texas A&M University (1988), pp. 93-101 (see, also, Dresser-Rand Technical Papers TP024, TP025 to Singh et al.). These cyclic symmetric modal solutions are usually called nodal diameter solutions because they are characterized by the presence of N diameters symmetrically positioned (ND) at which the modal displacement is approximately zero.

In experimental tests (like Wheel Box, or test vehicle), the identification of the ND solutions is a more complex task for at least the following reasons. First, the traditional output monitored during turbines blades testing is the strain gages signal spectrum in terms of amplitude and frequency. Therefore, it is not straightforward to assess whether the measured response peaks are relevant to "single blade" or "coupled" mode shapes. Second, the spatial shape of the excitation has to be consistent with the mode shape of the ND solution to transfer energy to the mode and make the response detectable. Therefore just some ND modes are expected to be observed during the test. Third, the blades and shaft system have a mistuned behavior due to the small geometrical differences introduced by the manufacturing process. This mistuning usually causes the presence of double peaks, which make the data analysis more complex.

In the investigation performed, the phase of the strain gage response was used to verify if a detected vibration amplitude peak could be associated to a "coupled mode," and in case of positive answer the phase was used to determine the number of nodal diameters of the detected mode. The basic assumption behind this methodology is that in a "coupled mode," all the blades vibrate in phase. In the test for the L0 row (last stage), just six blades (namely, in order, blades 1, 7, 14, 21, 28, and 35) out of 40 were instrumented; therefore, this methodology was expected to give a sufficient demonstration of the number of NDs just for the solutions up to 6 nodal diameters.

The acquisition system used during the test was able to track the amplitude and the phase of the response on every engine order ("XRev"). In this case, by setting one of the strain gauges as a reference, it is possible to read the evolution of the relative phase of the others throughout the whole rpm range.

Figure 13:
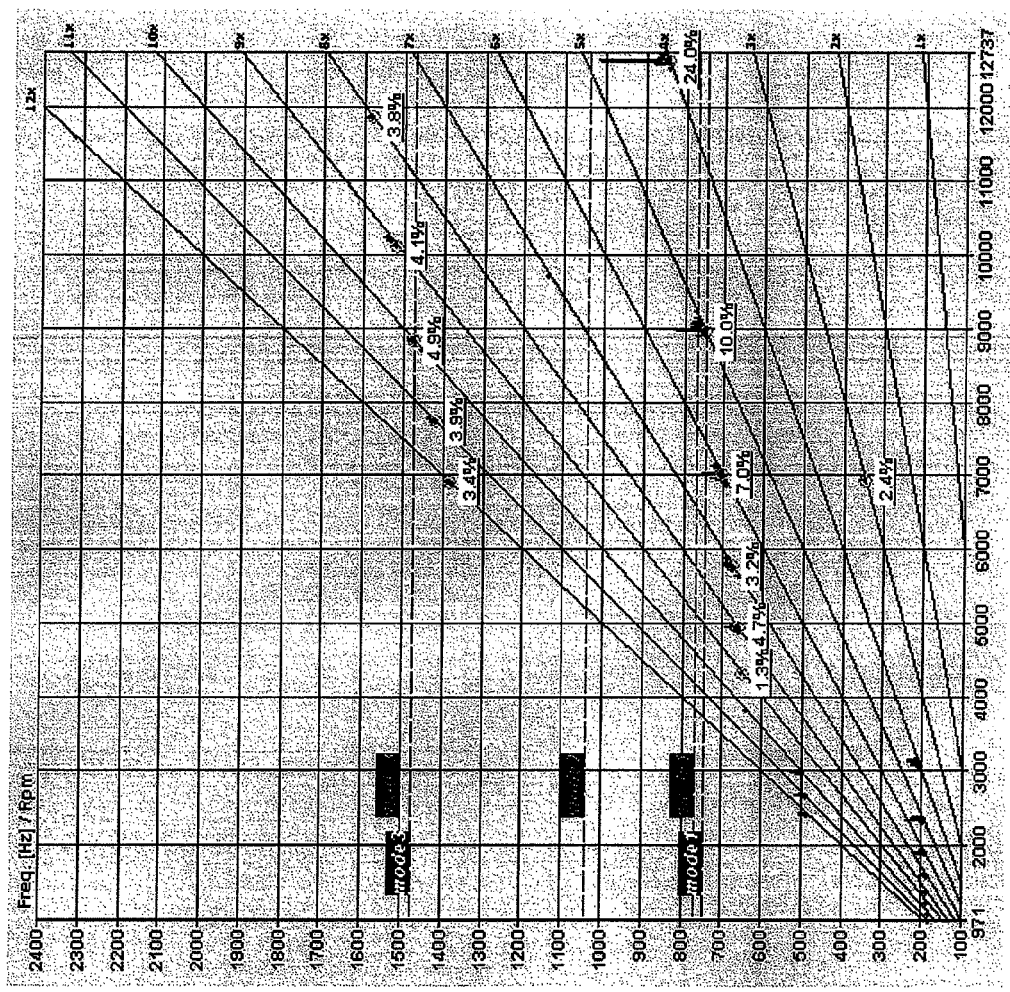
FIG. 13 is a Campbell diagram from which the data of FIGS. 12A-L is extracted along the 6th engine order, for an experimental test performed in accordance with some embodiments of the present invention.

FIGS. 12A-F show the magnitude (i.e., from the FFTs) of the responses (plotted as microstrain vs. rpm) and FIGS. 12G-L show the respective corresponding phase (i.e. from the FFTs, using the blade 1 as a reference) of the responses (plotted as degrees vs. rpm) for the six strain gauges, in blade order (e.g., FIG. 12A and FIG. 12G depict the magnitude and phase, respectively, for the strain gauge of blade 1, FIG. 12B and FIG. 12H are the magnitude and phase for the strain gauge of blade 7, etc.). The plots are extracted along the 6th engine order of the Campbell shown in FIG. 13. As indicated, plotted phases are calculated using the first blade as a reference (e.g., for each of the blades, the depicted phase data represents the difference between the FFT calculated phase for that blade and the FFT calculated phase for the first blade), and the plots are focused on a narrow band of RPM and are extracted for a specific "XRev" (6th in this case) of the Campbell diagram.

Referring to FIGS. 12A-G, when a peak in amplitude clearly appears in all the magnitude plots (resonance), a coherent phase behavior can be noticed in the phase plots on the right side, whereas away from the peak the phase behavior is incoherent or random. In other words, phases may be read or otherwise determined in a coherence window corresponding to a resonance condition (e.g., phases are determined at the resonance peak), because away from or outside of the neighborhood of the amplitude's peak the phase information appears as essentially random. The existence of a coherent phase evidences that the observed resonance is relevant to a "coupled mode". Since the mode is crossing a 6 XRev excitation, the most responding ND solution is expected to be the 6ND.

To support this hypothesis, the recorded phase angles were plotted on a polar plot and compared with the theoretical phase of a 6 ND modal solution according to the following procedure: (1) calculate the theoretical phase, $\phi_t(n)$, of each blade using equation (29) hereinabove for a given ND value (e.g, ND=6 for this example); (2) plot on a polar plot the theoretical blade displacement for each blade (e.g., displaying a curve through the theoretical blade displacement values) by calculating for each theoretical phase value the displacement $d(n)$ of the nth blade as the cosine of the theoretical phase value (i.e., d(n)=cos [φ_t(n)]); and (3) on the same polar plot, plot the displacement of the measured blades according to the measured phase (i.e., calculating, for each measured blade, d(n) as the cosine of the measured phase. The polar plot thus allows for visualizing the theoretical ND disposition as a reference with respect to the displacements corresponding to the measured phases.

Figure 14:
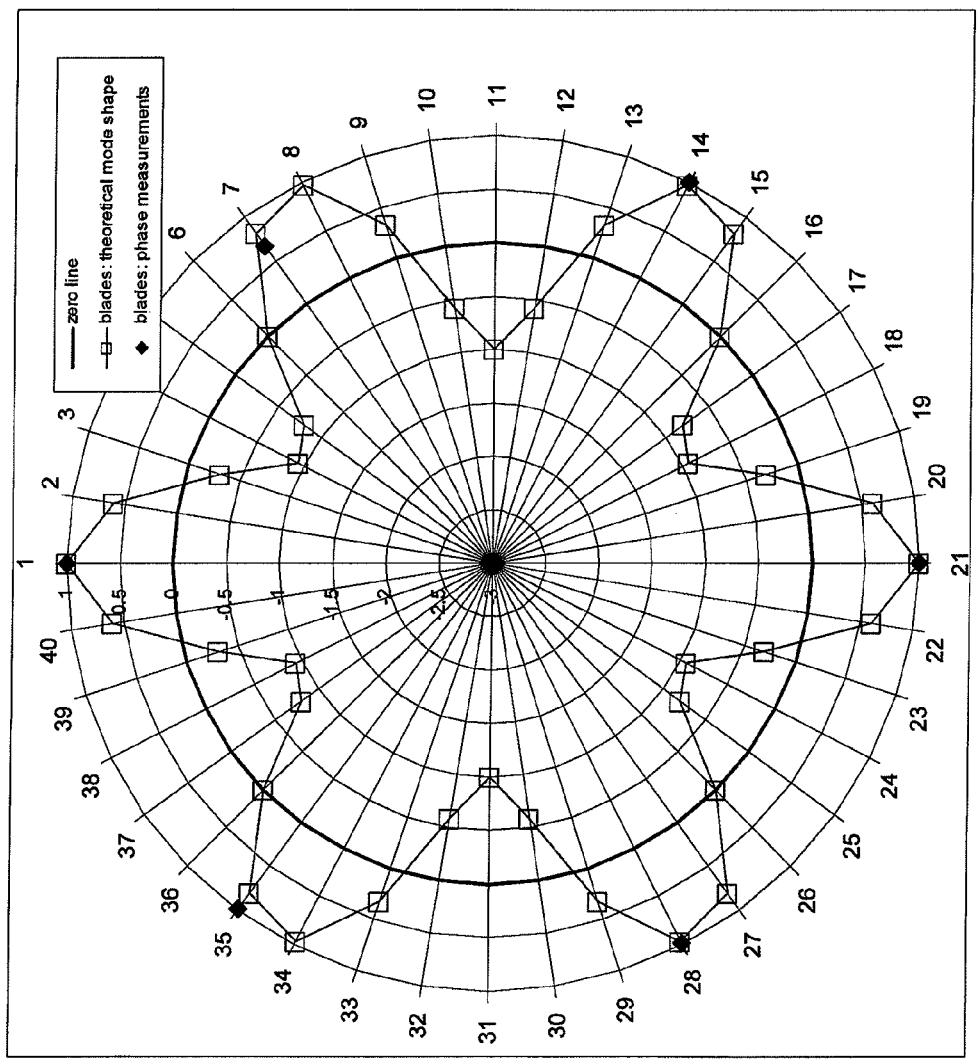
FIG. 14 shows a polar plot of displacement corresponding to theoretical blade phases and measured blade phases, corresponding to the data of FIGS. 12G-L, for an experimental test performed in accordance with some embodiments of the present invention.
Figure 15:
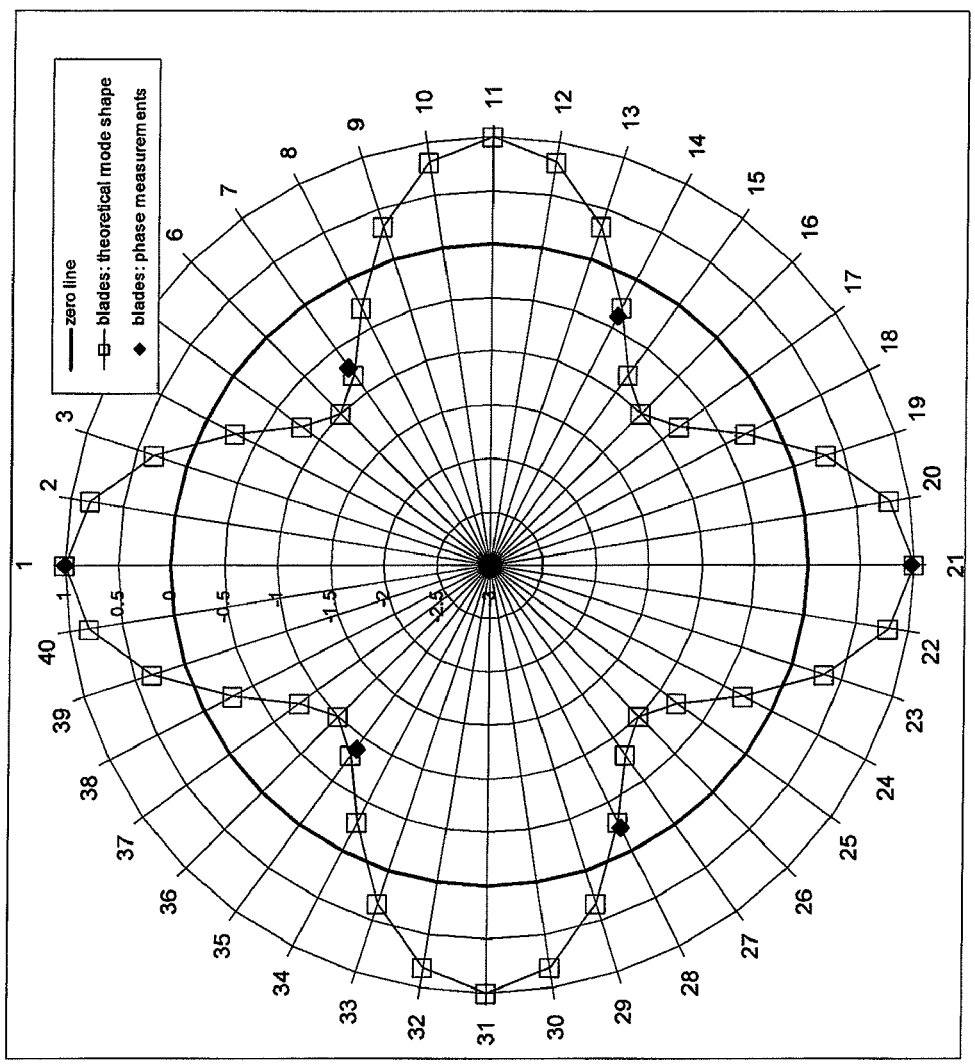
FIG. 15 shows a polar plot of displacement corresponding to the 4XRev crossing with the first mode, for an experimental test performed in accordance with some embodiments of the present invention.
Figure 16A:
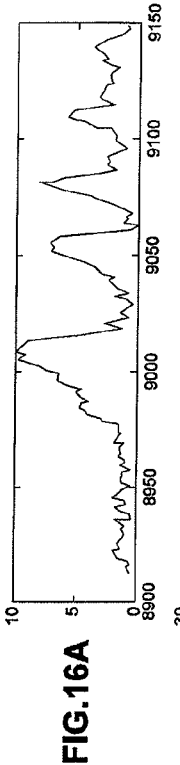
FIGS. 16A-L depict the magnitude data (microstrain vs. rpm) and the corresponding phase data (degrees vs. rpm) for six blades for the 5XRev crossing, for an experimental test performed in accordance with some embodiments of the present invention.
Figure 16B:
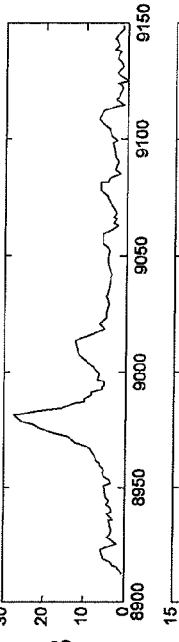
Figure 16C:
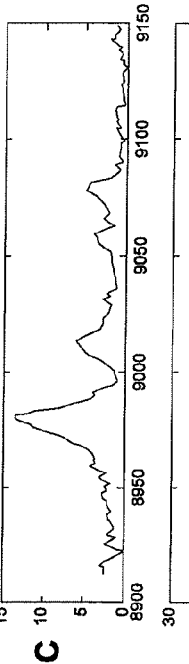
Figure 16D:
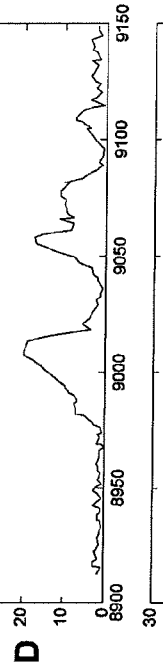
Figure 16E:
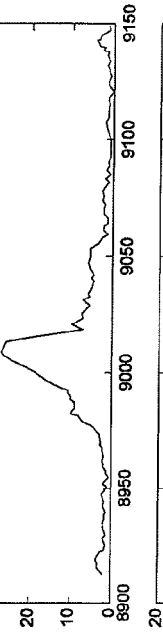
Figure 16F:
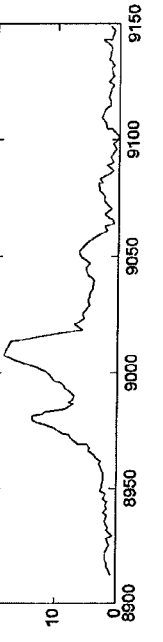
Figure 16G:
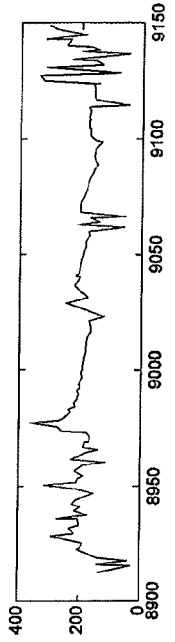
Figure 16H:
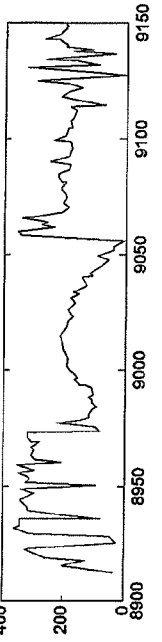
Figure 16I:
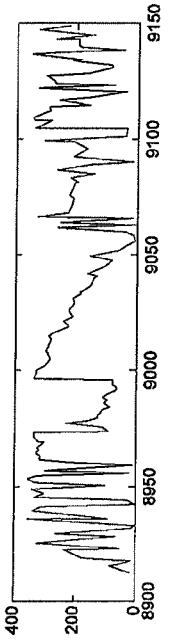
Figure 16J:
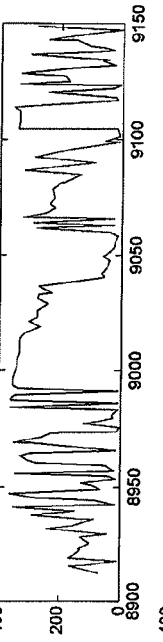
Figure 16K:
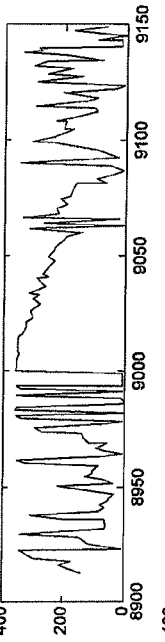
Figure 16L:
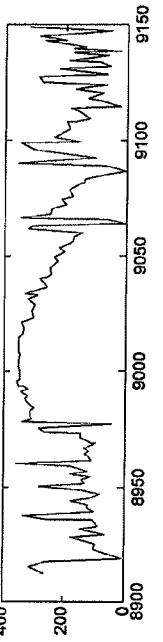

FIG. 14 shows the result of this procedure with the values from the experimental test represented by FIGS. 12A-L (corresponding to resonance along the $6^{th}$ XRev), and indicates that the match with ND=6 looks very good. (Note, the measured phase values, in degrees, for blades 1, 7, 14, 21, 28, and 35 were 0, 49.96491, −15.3813, −8.71609, −6.6103, and −15.0029, respectively.) It is noted that the theoretical displacements calculated in this way are not specifically linked to any particular vibratory mode shape (axial, tangential or torsional), but only to the nodal configuration. The theoretical displacement d(n) calculated according to the theoretical phases (as described above) simply show how the blades are displaced in the range +1/−1 according to the ND specified in equation (29). The same analysis was also successfully repeated on the 4XRev crossing with first mode, and the polar diagram depicted in FIG. 15 confirms that, as expected, a 4ND solution is found.

Figure 17A:
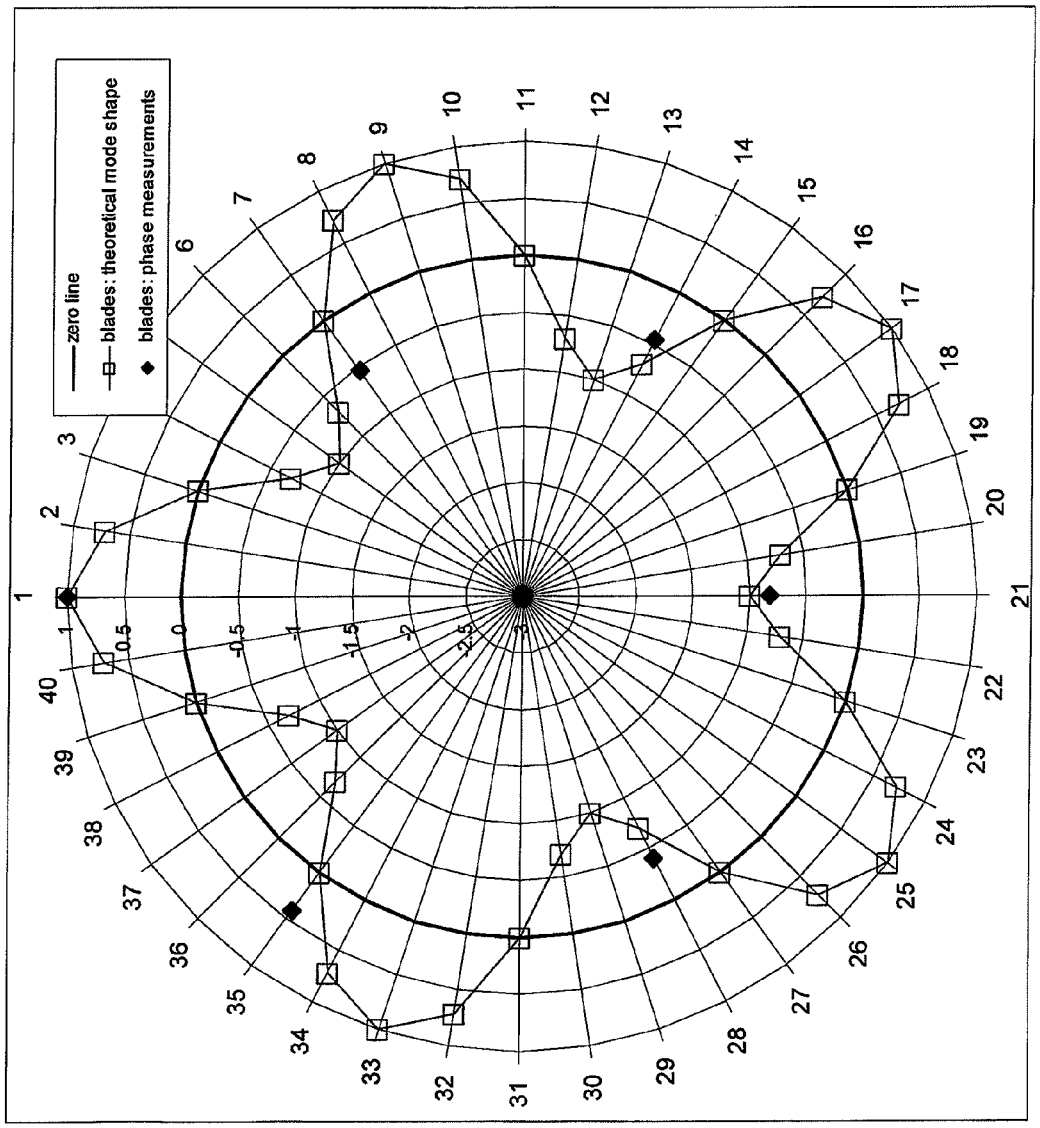
FIGS. 17A-C show polar plots of blade displacements corresponding to three respective peaks for the measured 5XRev crossing data, along with the theoretical displacements for a 5ND configuration, for an experimental test performed in accordance with some embodiments of the present invention.
Figure 17B:
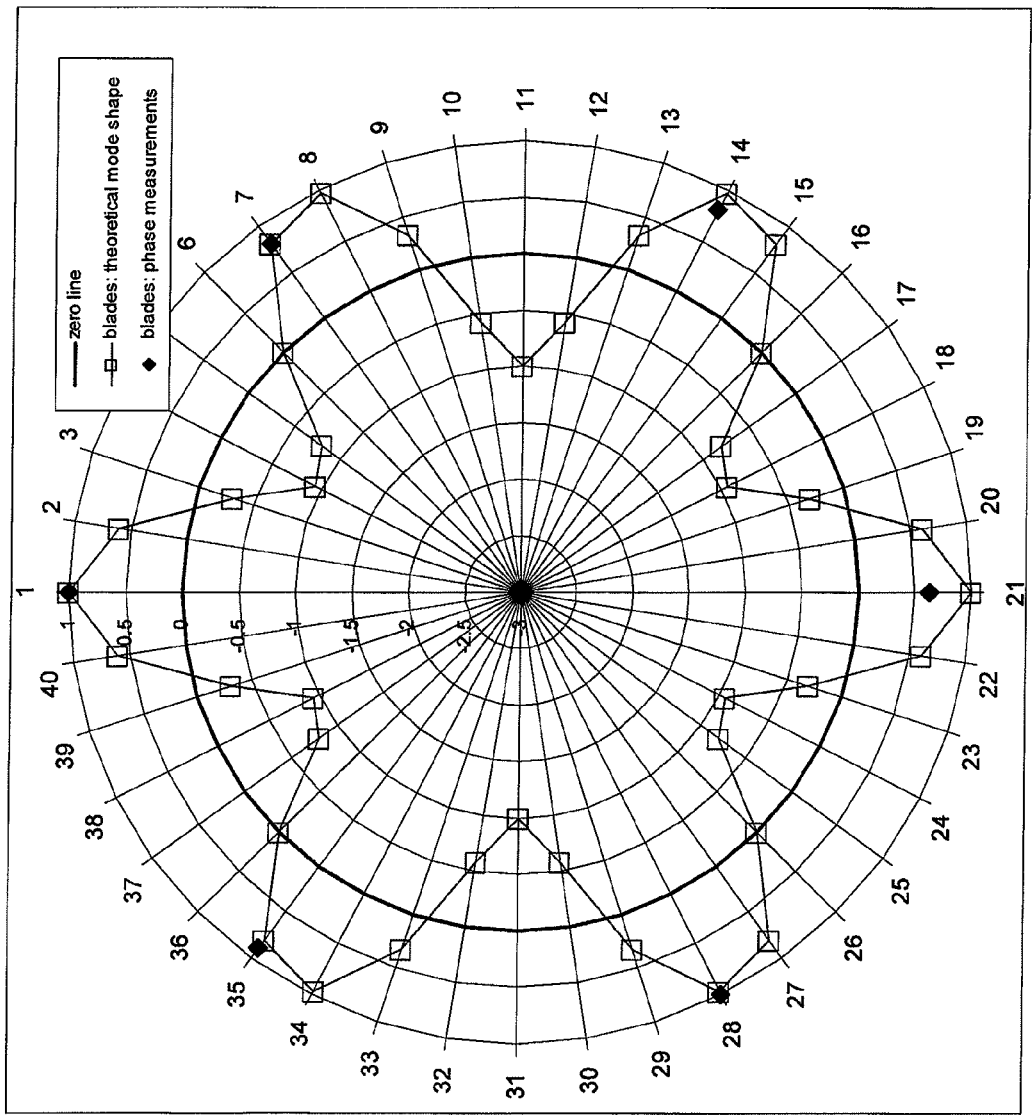
Figure 17C:
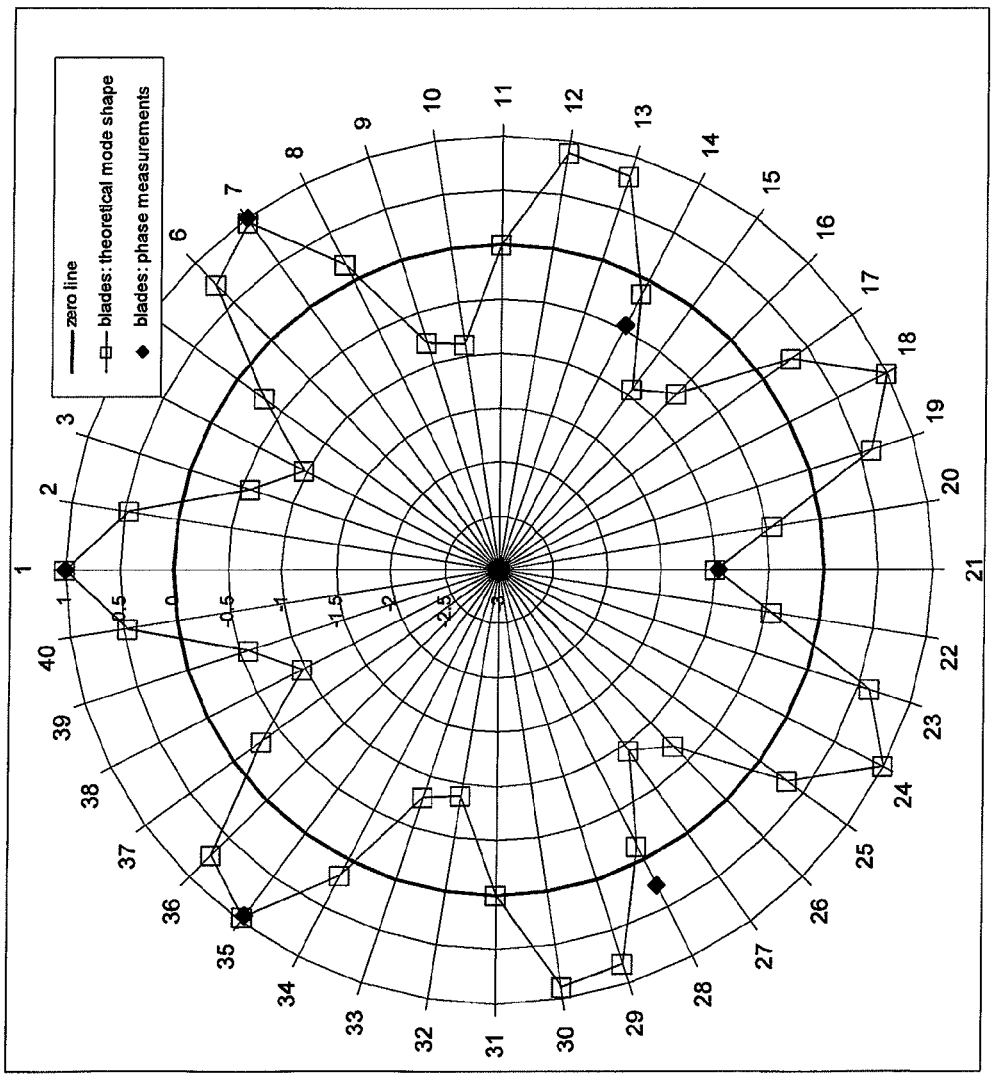

A classical example of a mistuning effect was observed at 5XRev crossing, for which the magnitude data (microstrain vs. rpm) is depicted in FIGS. 16A-F and the corresponding phase data (degrees vs. rpm) is depicted in FIGS. 16G-L, respectively, for each of the six measured blades, in order (i.e., blades 1, 7, 14, 21, 28, and 35). In the amplitude plots, it can be noted how some blades (7, 14 and 35) show multiple peaks. Performing the same analysis described above reveals that a coherent 5ND configuration occurs at approximately 8980 rpm, which is represented in the polar plot of FIG. 17A. The following peaks, respectively at 9010 and 9055 rpm, do not show a complete match with the theoretical 5ND; in fact, in both cases, blades 7 and 35 look off-phase by about 90°. The presence of additional peaks may be interpreted as a single blade mode that because of the effect of manufacturing variability in the cover contact is suppressed in some blades and visible in others. However, passing through 9080 and 9115 rpm, the stage shows again a coherent response, matching respectively the theoretical 6ND and 7ND configurations, as may be seen in the polar plot representations of FIGS. 17B and 17C, respectively.

In sum, the test results showed a very good match with numerical simulation (e.g. using ANSYS), allowed for input-output analysis, also providing for the possibility to have detailed information that may be used to reiterate on the model by changing the boundary conditions accordingly. Additionally, together with the standard output of an experimental analysis (e.g., Campbell diagram, Waterfall diagram), the technique, by means of a phase analysis, also allowed to have precise information on the modal shape of the wheel and of the blades. Depending on the total number of stain gauges used, the technique can identify the modal forms uniquely (necessary and sufficient condition). In other cases, the technique provides necessary information that can be used together with numerical simulation to provide for the sufficient part.

The present invention has been illustrated and described with respect to specific embodiments thereof, which embodiments are merely illustrative of the principles of the invention and are not intended to be exclusive or otherwise limiting embodiments. Accordingly, although the above description of illustrative embodiments of the present invention, as well as various illustrative modifications and features thereof, provides many specificities, these enabling details should not be construed as limiting the scope of the invention, and it will be readily understood by those persons skilled in the art that the present invention is susceptible to many modifications, adaptations, variations, omissions, additions, and equivalent implementations without departing from this scope and without diminishing its attendant advantages. For instance, except to the extent necessary or inherent in the processes themselves, no particular order to steps or stages of methods or processes described in this disclosure, including the figures, is implied. In many cases the order of process steps may be varied, and various illustrative steps may be combined, altered, or omitted, without changing the purpose, effect or import of the methods described. It is further noted that the terms and expressions have been used as terms of description and not terms of limitation. There is no intention to use the terms or expressions to exclude any equivalents of features shown and described or portions thereof. Additionally, the present invention may be practiced without necessarily providing one or more of the advantages described herein or otherwise understood in view of the disclosure and/or that may be realized in some embodiments thereof. It is therefore intended that the present invention is not limited to the disclosed embodiments but should be defined in accordance with the claims that follow.

What is claimed is:

1. A method providing for characterizing a turbine blade, the method comprising:
    providing at least one turbine blade on a rotor;
    rotating the rotor, thereby rotating the at least turbine blade;
    impinging a liquid onto the turbine blade during rotation of the at least one turbine blade; and
    providing a quantitative model of the excitation force imparted on the at least one turbine blade by the impinging liquid,
    wherein the excitation force model provides the excitation force as a function of time or provides the excitation force frequency components or harmonic content.

2. The method according to claim 1, wherein the liquid is an oil.

3. The method according to claim 1, wherein the liquid is impinged onto the at least one turbine blade via at least one nozzle.

4. The method according to claim 1, wherein the impingement of the liquid onto the at least one turbine blade is controlled according to said quantitative model of the excitation force imparted onto the at least one turbine blade by the liquid.

5. The method according to claim 1, further comprising processing signals received from sensors directly coupled or indirectly coupled to the turbine blades, wherein the processing is performed according, to said quantitative model.

6. The method according to claim 5, wherein the processing involves analyzing phase information from the sensors to determine the modal shape/nodal configuration among a plurality of the at least one turbine blade.

7. The method according to claim 6, wherein the sensors comprise strain gauges mechanically coupled to the turbine blades.

8. A method providing for characterizing at least one turbine blade, the method comprising:
    modeling the excitation force imparted onto the at least one turbine blade by a liquid; and
    controlling the impingement of the liquid onto the at least one turbine blade according to the excitation force model, wherein the excitation force model provides the excitation force as a function of time or provides the excitation force frequency components or harmonic content.

9. The method according to claim 8, wherein the liquid is an oil.

10. The method according to claim 8, further comprising processing signals received from sensors directly or indirectly coupled to the turbine blades to determine the modal shape/nodal configuration among a plurality of the at least one turbine blade.

11. A system comprising at least one computer-readable medium that stores programming that when executed by at least one computer is operative in the at least one computer implementing a method according to claim 8.

12. A method providing for characterizing at least one turbine blade, the method comprising processing signals received from sensors directly or indirectly coupled to turbine blades mechanically excited by a liquid, wherein the processing is performed according to a quantitative model of the excitation force imparted on the at least one turbine blade by the liquid, wherein the excitation force model provides the excitation force as a function of time or provides the excitation force frequency components or harmonic content.

13. The method according to claim 12, wherein the processing comprises determining the modal shape/nodal configuration among a plurality of the turbine blades.

14. A method for characterizing turbine blades, comprising processing phase signals received from sensors directly or indirectly coupled to turbine blades to determine the modal shape/nodal configuration among a plurality of the turbine blades, further comprising relating the response of the turbine blades determined by the modal shape/nodal configuration analysis with the quantification of the excitation to provide damping factors associated with at least one modal shape/nodal configuration.

15. The method according to claim 14, wherein the received phase signals correspond to the turbine blades being mechanically excited by a liquid.

16. At least one computer-readable medium that stores programming that when executed by at least one computer is operative in the at least one computer implementing a method according to claim 14.

\* \* \* \* \*